US008714601B2

(12) United States Patent
Kawamata

(10) Patent No.: US 8,714,601 B2
(45) Date of Patent: May 6, 2014

(54) FLANGED PIPE

(75) Inventor: Yasuji Kawamata, Oyama (JP)

(73) Assignee: Showa Denko K.K., Tokyo (JP)

( * ) Notice: Subject to any disclaimer, the term of this patent is extended or adjusted under 35 U.S.C. 154(b) by 315 days.

(21) Appl. No.: 12/740,511

(22) PCT Filed: Oct. 30, 2008

(86) PCT No.: PCT/JP2008/069716
§ 371 (c)(1),
(2), (4) Date: Aug. 3, 2010

(87) PCT Pub. No.: WO2009/057673
PCT Pub. Date: May 7, 2009

(65) Prior Publication Data
US 2010/0295296 A1    Nov. 25, 2010

(30) Foreign Application Priority Data

Oct. 31, 2007  (JP) ................................. 2007-284234

(51) Int. Cl.
*F16L 13/14*  (2006.01)
(52) U.S. Cl.
USPC ..................... 285/382.5; 285/412; 285/382.4; 285/222
(58) Field of Classification Search
USPC .................. 29/890.044, 523, 507; 285/382.4, 285/382.5, 222, 405, 412
See application file for complete search history.

(56) References Cited

U.S. PATENT DOCUMENTS

| | | | | |
|---|---|---|---|---|
| 779,896 | A | * | 1/1905 | Wood, Jr. .................... 285/381.1 |
| 1,530,266 | A | * | 3/1925 | Huston .......................... 285/222 |
| 4,334,703 | A | * | 6/1982 | Arthur et al. .................. 285/222 |
| 4,570,747 | A | * | 2/1986 | Ortyl ............................. 181/243 |

(Continued)

FOREIGN PATENT DOCUMENTS

| | | |
|---|---|---|
| JP | 63-42992 U | 3/1988 |
| JP | 3-41113 U | 4/1991 |

(Continued)

OTHER PUBLICATIONS

International Search Report of PCT/JP2008/069716, mailing date of Jan. 27, 2009.

*Primary Examiner* — James Hewitt
*Assistant Examiner* — Jay R Ripley
(74) *Attorney, Agent, or Firm* — Westerman, Hattori, Daniels & Adrian, LLP

(57) ABSTRACT

An engaging dented portion is formed in a region from an axially intermediate portion of the pipe insertion hole to a position of a connecting surface of a flange on an inner peripheral surface of the pipe insertion hole. The end portion of the pipe is inserted into the pipe insertion hole of the flange so that the end face of the pipe is positioned within a range from the axially intermediate portion of the pipe insertion hole to a position of the connecting surface of the flange. Next, each die segment of an expanding die arranged in the hollow portion of the pipe is moved radially outward of the pipe to thereby subject the end portion of the pipe to an expanding process so that the end portion of the pipe is engaged with the engaging dented portion. With this, the flange is connected to the end portion of the pipe.

3 Claims, 17 Drawing Sheets

(56) References Cited

U.S. PATENT DOCUMENTS

| | | | |
|---|---|---|---|
| 4,770,447 A * | 9/1988 | Umehara | 285/189 |
| 4,832,377 A * | 5/1989 | Umehara | 285/222 |
| 5,421,624 A * | 6/1995 | Hayashi et al. | 285/334.2 |
| 6,543,817 B1 * | 4/2003 | Turner et al. | 285/353 |
| 6,701,598 B2 * | 3/2004 | Chen et al. | 29/421.1 |

FOREIGN PATENT DOCUMENTS

| | | |
|---|---|---|
| JP | 4-8818 A | 1/1992 |
| JP | 7-223030 A | 8/1995 |
| JP | 11-36859 A | 2/1999 |
| JP | 2007-222877 A | 9/2007 |
| JP | 2007-275932 A | 10/2007 |

* cited by examiner

FLANGED PIPE

TECHNICAL FIELD

The present invention relates to a method of manufacturing a flanged pipe in which a flange to be connected to another member is connected to an end portion of a pipe, a manufacturing device for the flanged pipe, and the flanged pipe.

BACKGROUND ART

Conventionally, as a method for connecting a member-to-be-connected to a pipe, the following method, for example, is known.

A pipe is inserted into a pipe insertion hole formed in a member-to-be-connected, and an expanding die is placed in a hollow portion of the pipe. This die is divided into a plurality of die segments in the circumferential direction thereof centering around a wedge hole portion formed in the central portion of the die. Next, a wedge portion of a mandrel is inserted into the wedge hole portion of the die to thereby move each die segment of the die in the radially outward direction of the pipe. With this, the inserted portion of the pipe inserted in the pipe insertion hole and both axially adjacent portions of the inserted portion are subjected to an expanding process (i.e., diameter enlarging process) to thereby connect the member-to-be-connected to the pipe. This connecting method is also called a ridge lock processing method (see, for example, Patent Documents 1 to 3).

In this connecting method, both the axially adjacent portions of the inserted portion of the pipe inserted in the pipe insertion hole are locally pressed outwardly of the pipe from the inside of the pipe by two pressing protruded portions of the die segments, locally forming a pull-out preventing expanded portion (diameter enlarged tubular portion) at each of the axially adjacent portions. The member-to-be-connected is connected to the pipe in a state in which the member-to-be-connected is clamped by and between these two expanded portions. With this, the pull-out joint strength of the member-to-be-connected to the pipe is enhanced. Therefore, it is important to expand both the adjacent portions of the pipe to enhance the pull-out strength of the pipe.

Patent Document 1: Japanese Unexamined Laid-opened Patent Application Publication No. H4-8818 (page 2, FIG. 8)
Patent Document 2: Japanese Unexamined Laid-opened Patent Application Publication No. H11-36859
Patent Document 3: Japanese Unexamined Laid-opened Patent Application Publication No. H7-223030 (paragraphs [0004] to [0007], FIGS. 5 to 7)

DISCLOSURE OF THE INVENTION

Problems to be Solved by the Invention

In manufacturing a flanged pipe by connecting a flange as a member-to-be-connected to an end portion of a pipe according to the aforementioned method, there were the following disadvantages. These disadvantages will be explained with reference to FIGS. 18 and 19.

In FIG. 18, "101" denotes a pipe circular in cross-section, and "105" denotes a flange. Further, "120" denotes an expanding die, and "127" denotes an expanding mandrel. The die 120 is divided into a plurality of die segments 121 in the circumferential direction thereof centering around the wedge hole portion 123 formed in the central portion of the die 120.

Using the die 120 and the mandrel 127, in a state in which the end portion 102 of the pipe 101 is inserted in the pipe insertion hole 108 of the flange 105, a portion 102$a$ of the end portion 102 of the pipe 101 located at the end face side 102$x$ thereof and an adjacent portion 103 of the end portion 102 of the pipe 101 on the opposite side of the end face 102$x$ are subjected to an expanding process. With this, pull-out preventing enlarged portions (diameter enlarged tubular portions) B1 and B2 are locally formed on both end portions 102$a$ and 103 of the pipe 101, thereby fixing the flange 105 to the end portion 102 of the pipe 101.

In the case of this joining method, the enlarged portion B1, among both the enlarged portions B1 and B2, formed on the portion 102$a$ of the pipe 101 located on the side of the end face 102$x$, is positioned more outwardly than the connecting surface 105$a$ of the flange 105 since the enlarged portion B1 is engaged with the edge portion of the connecting surface 105$a$ of the flange 101. Therefore, as shown in FIG. 19, when connecting the flange 105 to another member 150, the portion 102$a$ of the end portion 102 of the pipe 101 on the side of the end face 102$x$ interferes with another member 150, causing a problem that the flange 105 cannot be connected to another member 150.

On the other hand, in order to solve this problem, if the enlarged portion B1 is not formed at the portion 102$a$ of the end portion 102 of the pipe 101 on the side of the end face 102$x$, the end portion 102 of the pipe 101 will be easily pulled out of the pipe insertion hole 108 of the flange 105, causing a problem that the pull-out strength of the pipe 101 to the flange 105 deteriorates. In FIG. 19, "115" denotes a connection bolt for connecting the flange 105 to another member 150, and "116" denotes a nut. Further, "112" denotes a bolt insertion hole of the flange 105, and "151" denotes a bolt insertion hole formed in another member 150.

Preferred embodiments of the present invention have been made in view of the aforementioned problems and/or other problems in the related art. The preferred embodiments of the present invention can significantly improve upon existing methods and/or apparatuses.

The present invention was made in view of the aforementioned technical background, and its purpose is to provide a method of manufacturing a flanged pipe with a high-joint strength between a flange and a pipe, a flanged pipe manufacturing device used in the aforementioned manufacturing method, and a flanged pipe.

Other objects and advantages of the present invention will be apparent from the following preferred embodiments.

Means for Solving the Problems

The present invention provides the following means.
[1] A flanged pipe manufacturing method comprising:
a step for preparing a flange having a pipe insertion hole and a connecting surface to be connected to another member, the flange being provided with an engaging dented portion in an area from an axially intermediate portion of the pipe insertion hole to a position of the connecting surface on an inner peripheral surface of the pipe insertion hole;
a step for preparing an expanding die divided into a plurality of die segments in a circumferential direction;
a pipe insertion step for inserting an end portion of a pipe in the pipe insertion hole of the flange so that an end face of the pipe is positioned within a range from the axially intermediate portion of the pipe insertion hole to the position of the connecting surface of the flange; and
an expanding process step for subjecting the end portion of the pipe and an adjacent portion of the end portion of the pipe located opposite to the end face of the pipe to an expanding process by moving each die segment of the die disposed in a hollow portion of the pipe radially outward of the pipe after the pipe insertion step to thereby joint the flange to the end portion of the pipe, wherein the expanding process step is performed so as to subject the end portion of the pipe to the expanding process so that the end portion of the pipe is engaged with the engaging dented portion in a pull-out direction of pulling out the end portion of the pipe from the pipe insertion hole.

[2] The manufacturing method of a flanged pipe as recited in the aforementioned Item 1, wherein the number of the engaging dented portion is plural, wherein the plurality of the engaging dented portions are provided at intervals in a circumferential direction of the pipe insertion hole, and wherein the expanding process step is performed so as to subject the end portion of the pipe to the expanding process so that the end portion of the pipe is engaged with each engaging dented portion in the circumferential direction of the pipe insertion hole.

[3] The manufacturing method of a flanged pipe as recited in the aforementioned Item 2, wherein an angular portion between the inner peripheral surface of the pipe insertion hole and an inner side surface of the engaging dented portion is angular, and wherein a cross-sectional angle of the angular portion is set to 90° or less.

[4] The manufacturing method of a flanged pipe as recited in the aforementioned Item 2 or 3, wherein the flange is integrally provided with a cylindrical portion protruded opposite to the connecting surface of the flange and having a hollow portion as the pipe insertion hole.

[5] The manufacturing method of a flanged pipe as recited in the aforementioned Item 4, wherein the axially intermediate portion of the cylindrical portion of the flange has a plurality of through-holes penetrating in a thickness direction of the cylindrical portion and arranged at intervals in a circumferential direction of the pipe insertion hole, wherein each engaging dented portion is formed by each through-hole.

[6] The manufacturing method of a flanged pipe as recited in the aforementioned Item 4 or 5, wherein, at the expanding process step, the end portion of the pipe is subjected to the expanding process in a state in which an outward expansion amount of the cylindrical portion is restricted by a restriction member arranged outside the cylindrical portion.

[7] The manufacturing method of a flanged pipe as recited in any one of the aforementioned Items 2 to 4, wherein each engaging dented portion is formed at a connecting surface side portion of the flange on the inner peripheral surface of the pipe insertion hole in a state in which each engaging dented portion opens toward an inner side of the pipe insertion hole and the connecting surface side of the flange.

[8] The manufacturing method of a flanged pipe as recited in the aforementioned Item 1, wherein the engaging dented portion is formed along an entire circumference of the pipe insertion hole in the circumferential direction thereof, and wherein, at the expanding process step, the end portion of the pipe is subjected to the expanding process so as to be engaged with the engaging dented portion along the entire periphery of the pipe insertion hole in the circumferential direction thereof.

[9] The manufacturing method of a flanged pipe as recited in the aforementioned Item 8, wherein an angular portion between the inner peripheral surface of the pipe insertion hole and an inner side surface of the engaging dented portion is angular, and wherein a cross-sectional angle of the angular portion is set to 90° or less.

[10] The manufacturing method of a flanged pipe as recited in the aforementioned Item 8 or 9, wherein the flange is integrally provided with a cylindrical portion protruded opposite to the connecting surface of the flange and having a hollow portion as the pipe insertion hole.

[11] The manufacturing method of a flanged pipe as recited in the aforementioned Item 10, wherein, at the expanding process step, the end portion of the pipe is subjected to an expanding process in a state in which an outward expansion amount of the cylindrical portion is restricted by a restriction member arranged outside the cylindrical portion.

[12] The manufacturing method of a flanged pipe as recited in any one of the aforementioned Items 8 to 10, wherein engaging dented portion is formed at a connecting surface side portion of the flange on the inner peripheral surface of the pipe insertion hole in a state in which engaging dented portion opens toward an inner side of the pipe insertion hole and the connecting surface side of the flange.

[13] A flanged pipe manufacturing device for manufacturing a flanged pipe in which a flange having a pipe insertion hole and a connecting surface to be connected to another member is connected to an end portion of a pipe with the end portion of the pipe inserted in the pipe insertion hole, wherein an engaging dented portion is formed at a region from an axially intermediate portion of the pipe insertion hole to a position of the connecting surface on an inner peripheral surface of the pipe insertion hole of the flange, wherein the flanged pipe manufacturing device includes a die to be arranged in a hollow portion of the pipe, the die being configured to subject the end portion of the pipe and an adjacent portion of the end portion of the pipe opposite to an end surface side of the pipe to an expanding process, wherein the die is divided into a plurality of die segments in a circumferential direction thereof, wherein at least one die segment among the plurality of die segments of the die has a pressing protruded portion, and wherein the pressing protruded portion is configured to press the end potion of the pipe outwardly of the pipe to thereby protrude the end portion of the pipe outwardly of the pipe so that the end portion of the pipe is engaged with the engaging dented portion in a pull-out direction of pulling out the end portion of the pipe from the pipe insertion hole.

[14] The flanged pipe manufacturing device as recited in the aforementioned Item 13, wherein the flange is integrally provided with a cylindrical portion protruded opposite to the connecting surface of the flange and having a hollow portion as the pipe insertion hole, and wherein the flanged pipe manufacturing device is equipped with a restriction member to be disposed outside the cylindrical portion to restrict an outward expansion amount of the cylindrical portion during the expanding process.

[15] A flanged pipe in which a flange having a pipe insertion hole and a connecting surface to be connected to another member is connected to an end portion of a pipe with the end portion of the pipe inserted in the pipe insertion hole, wherein an engaging dented portion is formed at a region from an axially intermediate portion of the pipe insertion hole to the position of the connecting surface on an inner peripheral surface of the pipe insertion hole of the flange, wherein the end portion of the pipe is inserted in the pipe insertion hole of the flange in a state in which an end face of the pipe is positioned within a range from the axially intermediate portion of the pipe insertion hole to the position of the connecting surface of the flange, wherein the end portion of the pipe and an adjacent portion of the end portion of the pipe opposite to the end face side of the pipe are expanded, whereby the flange is connected to the end portion of the pipe, and wherein the end portion of the pipe is expanded in a state in which the end portion of the pipe is engaged with the engaging dented portion in a pull-out direction of pulling out the end portion of the pipe from the pipe insertion hole.

[16] The flanged pipe as recited in the aforementioned Item 15, wherein the number of the engaging dented portions is plural, wherein the plurality of the engaging dented portions are provided at intervals in a circumferential direction of the pipe insertion hole, and wherein the end portion of the pipe is expanded so that the end portion of the pipe is engaged with each engaging dented portion in the circumferential direction of the pipe insertion hole.

[17] The flanged pipe as recited in the aforementioned Item 16, wherein an angular portion between the inner peripheral surface of the pipe insertion hole and an inner side surface of the engaging dented portion is angular, and wherein a cross-sectional angle of the angular portion is set to 90° or less.

[18] The flanged pipe as recited in the aforementioned Item 16 or 17, wherein the flange is integrally provided with a cylindrical portion protruded opposite to the connecting surface of the flange and having a hollow portion as the pipe insertion hole.

[19] The flanged pipe as recited in the aforementioned Item 18, wherein the axially intermediate portion of the cylindrical portion of the flange has a plurality of through-holes penetrating in a thickness direction of the cylindrical portion and arranged at intervals in a circumferential direction of the pipe insertion hole, wherein each engaging dented portion is formed by each through-hole.

[20] The flanged pipe as recited in any one of the aforementioned Items 16 to 18, wherein each engaging dented portion is formed at a connecting surface side portion of the flange on the inner peripheral surface of the pipe insertion hole in a state in which each engaging dented portion opens toward an inner side of the pipe insertion hole and the connecting surface side of the flange.

[21] The flanged pipe as recited in the aforementioned Item 15, wherein the engaging dented portion is formed along the entire periphery of the pipe insertion hole in the circumferential direction thereof, and wherein the end portion of the pipe is expanded so that the end portion of the pipe is engaged with the engaging dented portion along the entire periphery of the pipe insertion hole in the circumferential direction thereof.

[22] The flanged pipe as recited in the aforementioned Item 21, wherein an angular portion between the inner peripheral surface of the pipe insertion hole and an inner side surface of the engaging dented portion is angular, and wherein a cross-sectional angle of the angular portion is set to 90° or less.

[23] The flanged pipe as recited in the aforementioned Item 21 or 22, wherein the flange is integrally provided with a cylindrical portion protruded opposite to the connecting surface of the flange and having a hollow portion as the pipe insertion hole.

[24] The flanged pipe as recited in any one of the aforementioned Items 21 to 23, wherein engaging dented portion is formed at a connecting surface side portion of the flange on the inner peripheral surface of the pipe insertion hole in a state in which engaging dented portion opens toward an inner side of the pipe insertion hole and the connecting surface side of the flange.

Here, in the aforementioned invention, the end portion of the pie denotes a portion of the pipe inserted in the pipe insertion hole of the flange, i.e., the inserted portion of the pipe inserted in the pipe insertion hole.

Effects of the Invention

The present invention exerts the following effects.

In the manufacturing method of a flanged pipe according to the invention [1], by subjecting the end portion of the pipe to an expanding process so that the end portion of the pipe is engaged with the engaging dented potion in a pull-out direction of pulling out the end portion of the pipe from the pipe insertion hole, the pull-out strength of the pipe to the flange can be enhanced.

Furthermore, the expanding process is performed in a state in which the end portion of the pipe is inserted in the pipe insertion hole so that the end face of the pipe is positioned in a range from the axially intermediate portion of the pipe insertion hole to a position of the connecting surface of the flange. Therefore, in connecting the flange connected to the end portion of the pipe to another member, the end face side portion of the end portion of the pipe does not interfere with another member. Thus, the flange can be connected to another member in a favorable manner.

In the invention [2], by subjecting the end portion of the pipe to an expanding process so that the end portion of the pipe is engaged with each engaging dented portion in the circumferential direction of the pipe insertion hole, in addition to the pull-out strength of the pipe to the flange, the joint strength of the pipe to the flange in the rotational direction can also be enhanced.

In the invention [3], the angular portion between the inner peripheral surface of the pipe insertion hole of the flange and the inner side surface of the engaging dented portion is angular and the cross-sectional angle of the angular portion is set to 90° or less. Therefore, this angular portion prevents the pipe from being pulled out, which in turn can further enhance the pull-out strength of the pipe to the flange.

In the invention [4], since the flange is integrally provided with a cylindrical portion having a hollow portion as the pipe insertion hole, the contact area between the end portion of the pipe and the flange can be increased, and the weight increase of the flange can be restrained as much as possible. This enhances the joint strength between the pipe and the flange and attains the weight saving of the flanged pipe.

In the invention [5], since each engaging dented portion is formed by each through-hole, each engaging dented portion can be formed easily.

Furthermore, by punching the through-hole for forming the engaging dented portion in the cylindrical portion of the flange with a punch, the angular portion between the inner peripheral surface of the pipe insertion hole and the inner side surface of the engaging dented portion can be easily formed into an angular shape, and the cross-section angle of this angular portion can be easily set to 90°. This further enhances the pull-out strength of the pipe to the flange.

Furthermore, the end portion of the pipe can be engaged with each engaging dented portion in the pull-out direction of pulling out the end portion of the pipe from the pipe insertion hole, in the insertion direction of inserting the end portion of the pipe into the pipe insertion hole, and in the circumferential direction of the pipe insertion hole. Therefore, the joint strength of the pipe to the flange in the pull-out direction (i.e., the pipe pull-out strength), the joint strength of the pipe to the flange in the pipe insertion direction, and the joint strength of the pipe to the flange in the rotational direction can be enhanced.

In the invention [6], by subjecting the end portion of the pipe to an expanding process in a state in which an outward expansion amount of the cylindrical portion is restricted by a restriction member arranged outside the cylindrical portion, the plastic deformation of the cylindrical portion during the expanding process can be prevented, and possible breakage of the cylindrical portion can also be prevented. This enables assured accumulation of the elastic restoring force in the cylindrical portion during the expanding process, resulting in assuredly enhanced joint strength between the flange and the pipe.

In the invention [7], each engaging dented portion can be easily formed.

In the invention [8], the pull-out strength of the pipe to the flange can be enhanced assuredly.

In the invention [9], in the same reason as that of the aforementioned invention [3], the pull-out strength of the pipe to the flange can be further enhanced.

In the invention [10], in the same reason as that of the aforementioned invention [4], the joint strength of the pipe to the flange can be further enhanced, and the weight saving of the flanged pipe can be attained.

In the invention [11], in the same reason as that of the aforementioned invention [6], the joint strength of the pipe to the flange can be further enhanced.

In the invention [12], the engaging dented portion can be easily formed.

In the inventions [13] and [14], the flanged pipe manufacturing device preferably used in the flanged pipe manufacturing method of the present invention can be provided.

In the flanged pipe according the inventions [15]-[19], the same effects as those of the aforementioned inventions [1]-[5] can be exerted in manufacturing the flanged pipe.

In the invention [20], the same effects as those of the aforementioned invention [7] can be exerted in manufacturing the flanged pipe.

In the inventions [21]-[23], the same effects as that of the aforementioned inventions [8]-[10] can be exerted in manufacturing the flanged pipe.

In the invention [24], the same effects as those of the aforementioned invention [12] can be exerted in manufacturing the flanged pipe.

DESCRIPTION OF THE REFERENCE NUMERALS

Figure 1:
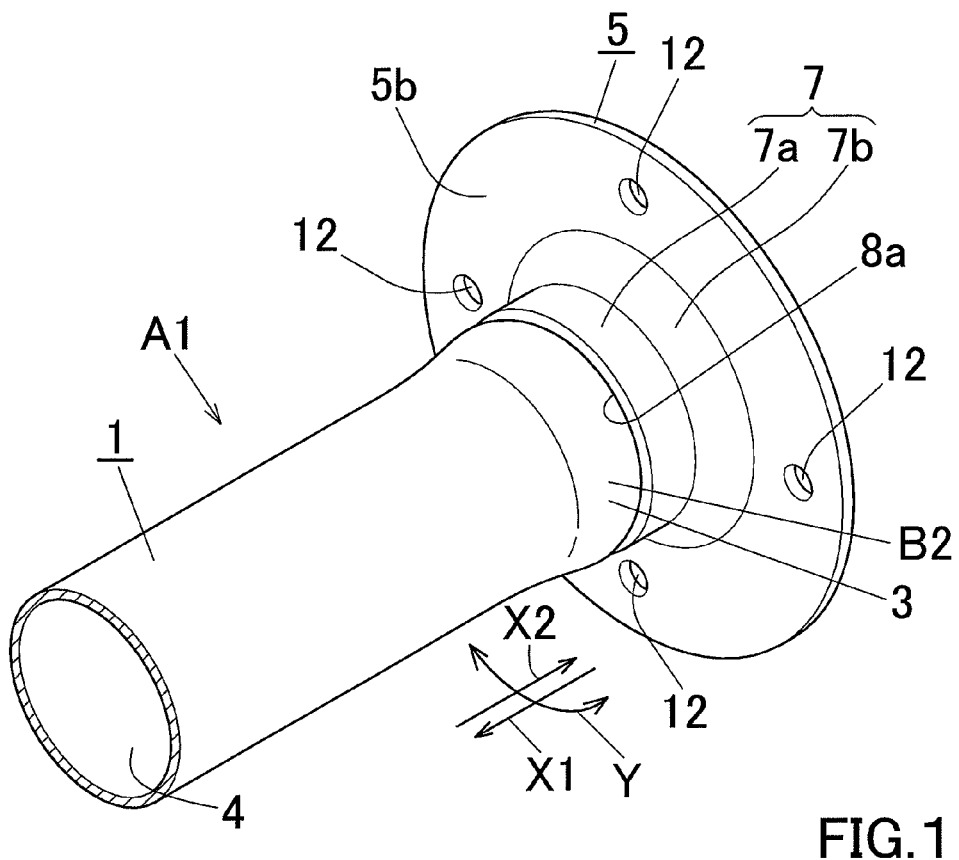
FIG. 1 is a perspective view of a flanged pipe according to a first embodiment of the present invention.

A1-A6: Flanged pipe
1: Pipe
2: End portion of the pipe
2a: Portion of the end portion of the pipe on the side of the end face
2b: Axially intermediate portion of the end portion of the pipe
2c: Adjacent portion of the end portion of the pipe
5: Flange
5a: Connecting surface
7: Cylindrical portion
7c: Penetrated portion
8: Pipe insertion hole
9: Inner peripheral surface of the pipe insertion hole
10: Engaging dented portion
10a: Inner side surface of the engaging dented portion
11: Angular portion
20: Expanding die
21: Die segment
22a: First pressing protruded portion
22b: Second pressing protruded portion
23: Wedge hole portion
27: Mandrel
27a: Wedge portion
28: Restriction member
30: Flanged pipe manufacturing device
50: Another member B1, B2: Pull-out preventing expanded portion
X1: Pull-out direction of pulling out the end portion of the pipe from the pipe insertion hole
X2: Insertion direction of inserting the end portion of the pipe into the pipe insertion hole
Y: Circumferential direction of the pipe insertion hole

BEST MODE FOR CARRYING OUT THE INVENTION

Next, several embodiments of the present invention will be explained with reference to drawings.

First Embodiment

FIGS. 1 to 6 are explanatory views showing a flanged pipe manufacturing method and a manufacturing device according to a first embodiment of the present invention.

In FIGS. 1 to 6, "A1" denotes a flanged pipe manufactured by a manufacturing device 30 according to a first embodiment. This flanged pipe A1 is a member in which a flange 5 is secured to the end portion 2 of the pipe 1 in a fixed manner.

The pipe 1 is used as, for example, an automobile component, such as, e.g., a steering support beam, a steering column holder, a muffler, a frame, a propeller shaft, or a suspension arm, or a piping member. In the present invention, however, the pipe 1 is not limited to be used as one of the aforementioned members.

This pipe 1 is a straight member and is circular in cross-section. Further, the pipe 1 has a hollow portion 4 circular in cross-section and extending in the axial direction (i.e., in the length direction thereof). Further, the inner diameter and the wall thickness of the pipe 1 are set to be constant in the axial direction of the pipe 1.

The pipe 1 is made from elastically deformable and plastically deformable material, such as, e.g., metal, more specifically aluminum (including its alloy). In the present invention, however, the material of the pipe 1 is not limited to aluminum, and can be, for example, metal, such as, e.g., iron, steel (including stainless steel), copper, or plastics. Furthermore, the pipe 1 can be made of an extruded member, a drawn member, a welded member, or any other member made by any other method.

Figure 3:
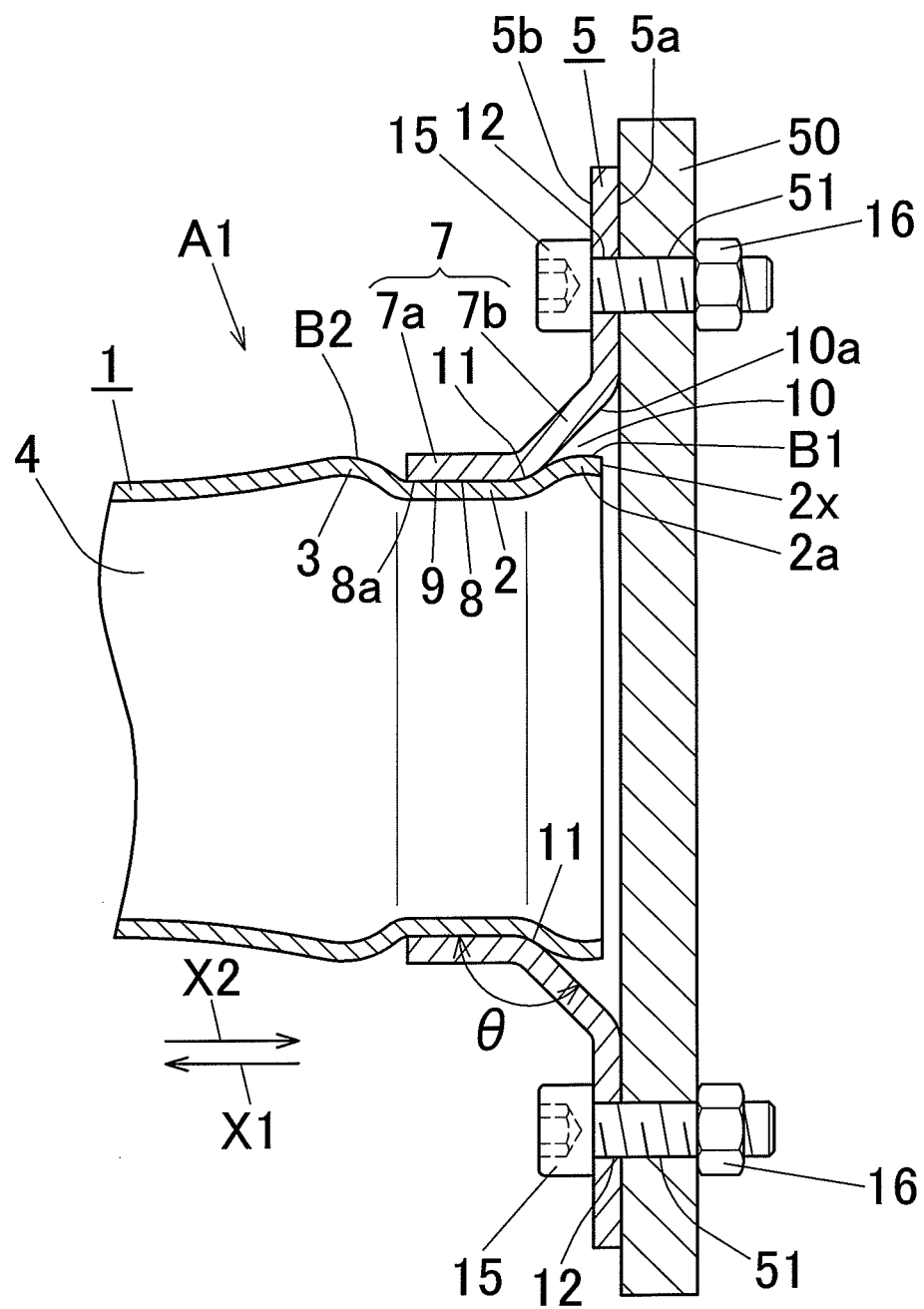
FIG. 3 is a cross-sectional view showing a state in which the flanged pipe is connected to another member.

The flange 5 is, as shown in FIG. 3, a member to be connected to another member 50. The another member 50 is, for example, a plate-shaped member.

This flange 5 is made from elastically deformable material, such as, e.g., metallic material, more specifically, aluminum (including its alloy). In the present invention, however, the material of the flange 5 is not limited to aluminum, and can be, for example, metal, such as, e.g., iron, steel (including stainless steel) or copper, or plastics. Further, the flange 5 can be an extruded member or a rolled member, or any other members produced by another method.

This flange 5 is a press-formed article of a metal plate and formed into a plate-shape having a pipe insertion hole 8 the central portion thereof, more specifically formed into an annular plate shape. In this flange 5, one of the thickness side surfaces thereof is used as a connecting surface 5a for connecting another member 50. This connecting surface 5a is formed into a flat-shape. In this embodiment, the surface 5b of the flange 5 opposite to the connecting surface 5a is referred to as the other surface of the flange 5.

In the outer peripheral surface portion of the flange 5, a plurality of connecting tool insertion holes, such as, e.g., bolt insertion holes 12, are formed at equal intervals in the circumferential direction centering around the pipe insertion hole 8. In this embodiment, the number of bolt insertion holes 12 is four.

As shown in FIG. 3, the flange 5 is integrally provided with a cylindrical portion 7 protruded to the opposite side of the connecting surface 5a of the flange 5. This cylindrical portion 7 has a hollow portion and an inner peripheral surface functioning as the pipe insertion hole 8 and the inner peripheral surface 9 thereof, respectively, and is integrally bent from the flange 5 so as to surround the pipe insertion hole 8.

The pipe insertion hole 8 of the flange 5 has an opening opened to the opposite side of the connecting surface 5a of the flange 5 (i.e., the other surface 5b side of the flange 5) which functions as a pipe inlet opening 8a and a pipe pull-out opening 8b, respectively.

The flange 5 and the cylindrical portion 7 are integrally formed each other by subjecting a metal plate to press work. Specifically, the cylindrical portion 7 is formed cylindrically by subjecting the inner peripheral edge portion of the pipe insertion hole 8 of the plate-shaped flange 5 to press work.

The tip end side portion 7a of the cylindrical portion 7 extending from the axially intermediate portion thereof is formed into a short cylindrical shape. The cross-sectional shape of the hollow portion of this cylindrical portion 7a, i.e., the cross-sectional shape of the pipe insertion hole 8, corresponds to the cross-sectional shape of the end portion 2 of the pipe 1, i.e., a circular shape.

The flange side portion 7b of the cylindrical portion 7 extending from the axially intermediate portion to the flange 5 is formed into a tapered shape having a diameter gradually increased as it extends toward the flange 5. With this, at the portion of the flange 5 located at the side of the connecting surface 5a, an engaging dented portion 10 is formed along the entire circumference of the pipe insertion hole 8 in such a manner that it opens to the inner side of the pipe insertion hole 8 and to the connecting surface 5a side of the flange 5. More specifically, the engaging dented portion is provided at the area covering from the axially intermediate portion of the pipe insertion hole 8 to the position of the connecting surface 5a of the flange 5 on the inner peripheral surface 9 of the pipe insertion hole 8 of the flange 5. This engaging dented portion 10 is formed by press work.

The angular portion 11 formed between the inner peripheral surface 9 of the pipe insertion hole 8 and the inner side surface 10a of the engaging dented portion 10 is rounded along the entire circumference of the pipe insertion hole 8. In other words, the angular portion 11 is formed into a circular arc shape in cross-section. Further, the cross-sectional angle θ of this angular portion 11 is formed to have an angle larger than 90° (degrees) (i.e., θ>90°).

The length of the pipe 1 is, for example, 50 to 2,000 mm. The inner diameter of the pipe 1 is, for example, 20 to 100 mm. The thickness of the pipe 1 is, for example, 0.5 to 5 mm.

The thickness of the flange 5 and that of the cylindrical portion 7 each are, for example, 1 to 20 mm. The outer diameter of the flange 5 is, for example, 30 to 300 mm. The diameter of the pipe insertion hole 8 of the flange 5 is formed to be larger than the outer diameter of the end portion 2 of the pipe 1 before the expanding process by, for example, 0.1 to 1 mm.

In the present invention, however, it is not limited that the size of each portion of the pipe 1 and flange 5 falls within the aforementioned range, and can be arbitrarily set depending on the intended purpose or usage of the flanged pipe A1.

Hereinafter, for reasons of explanatory simplicity, the portion 2a of the end portion 2 of the pipe 1 located at the side of the end face 2x is referred to as "end face portion 2a of the end portion 2 of the pipe 1."

In the flanged pipe A1 of this first embodiment, as shown in FIG. 3, the end portion 2 of the pipe 1 is inserted into the pipe insertion hole 8 of the flange 5 from the pipe insertion opening 8a with the end face 2x of the pipe 1 positioned within the range from the axially intermediate portion of the pipe insertion hole 8 to the position of the connecting surface 5a of the flange 5. In this state, the end portion 2 of the pipe 1 is subjected to an expanding process (i.e., pipe diameter enlarging process) so that the end face portion 2a of the end portion 2 of the pipe 1 is protruded in the engaging dented portion 10 of the pipe insertion hole 8 along the entire circumference of the end face portion 2a. With this, the end portion 2 of the pipe 1 is engaged with the engaging dented portion 10 along the entire circumference of the pipe insertion hole 8 in the pull-out direction X1 of pulling out the end portion 2 of the pipe 1 from the pipe insertion hole 8. Furthermore, the adjacent portion 3 of the pipe 1 adjacent to the end portion 2 of the pipe 1 and positioned on the opposite side of the end face 2x of the pipe is subjected to an expanding process (i.e., pipe diameter enlarging process) along the entire circumference thereof.

In detail, at the end face portion 2a of the end portion 2 of the pipe 1, the pipe 1 is provided with a pull-out preventing first expanded portion (pipe diameter enlarged portion) B1 locally expanded outwardly of the pipe 1 and formed along the entire circumference of the pipe 1 by an expanding process. The first expanded portion B1 is disposed in the engaging dented portion 10 and engaged with the engaging dented portion 10 in the aforementioned one direction (i.e., pull-out direction X1). However, the first expanded portion B1 is not engaged with the engaging dented portion 10 in the circumferential direction Y of the pipe insertion hole 8 (see FIG. 1).

Furthermore, at the adjacent portion 3 of the end portion 2 of the pipe 1, a pull-out preventing second expanded portion B2 locally expanded outwardly of the pipe 1 by an expanding process is formed along the entire circumference of the pipe 1. The second expanded portion B2 is engaged with the tip end of the cylindrical portion 7 of the flange 5 in the insertion direction X2 of inserting the end portion 2 of the pipe 1 into the pipe insertion hole 8.

In the flanged pipe A1 shown in FIG. 3, connection bolts 15 as connecting members are inserted sequentially into the connecting member insertion hole (bolt insertion hole 12) of the flange 5 and the connecting member insertion hole (bolt insertion hole 51) of another member 50 and screwed by nuts 16. Thus, the flanged pipe A1 is fixedly connected to another member 50. In this state, the connecting surface 5a of the flange 5 is in face-to-face contact with another member 50, and the end face 2x of the pipe 1 is not positioned outwardly of the position of the connecting surface 5a of the flange 5, and therefore the end face 2x is not in contact with another member 50. In the present invention, the connecting member is not limited to the connection bolt 51, and can be, for example, a connecting rivet.

Next, a manufacturing device 30 of the flanged pipe A1 of this first embodiment will be explained with reference to FIGS. 4 to 6.

This manufacturing device 30 is equipped with, for example, an expanding die 20, an expanding mandrel 27, a restriction member 28.

Figure 4:
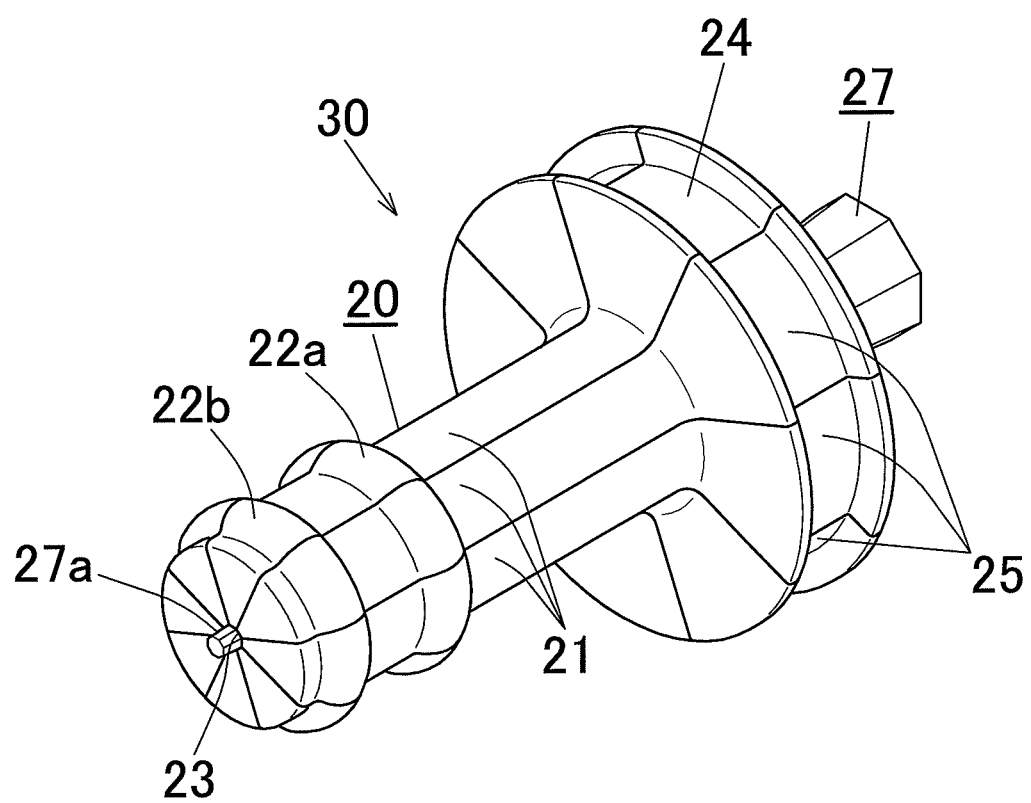
FIG. 4 is a perspective showing an expanding die and a mandrel of a flanged pipe manufacturing device according to the first embodiment.

As shown in FIG. 4, the die 20 is a cylindrical member made of, e.g., tool steel or super hard alloy. Furthermore, the die 20 is integrally provided with a circular plate-shaped or cylindrical supporting portion 24 for supporting the die 20 in a cantilevered manner at the axial one end portion of the die 20. This supporting portion 24 is formed to have a diameter larger than the diameter of the die 20.

The die 20 has a wedge hole portion 23 penetrating through the central portion of the die 20 and the supporting portion 24 in the axial direction of the die 20. The wedge hole portion 23 can have a corn shape or a polygonal pyramid shape. In this embodiment, it has a polygonal pyramid shape, more specifically an octahedral polygonal pyramid shape. Therefore, the cross-sectional shape of the wedge hole portion 23 is an octagon shape.

Furthermore, the die 20 is divided equally circumferentially into a plurality of die segments 21 centering around the wedge hole portion 23, and in accordance with this, the supporting portion 24 is also divided equally circumferentially into a plurality of supporting portion segments 25 centering around the wedge hole portion 23. In this embodiment, the divisional number of the die 20 and that of the supporting portion 24 each are eight. Furthermore, the die segment 21 and the supporting portion segment 25 are formed integrally with each other.

The mandrel 27 has a wedge portion 27a corresponding to the wedge hole portion 23 of the die 20. This wedge portion 27a is integrally formed at the tip end portion of the mandrel 27 in a tapered manner. The wedge portion 27a can have a corn shape or a polygonal pyramid shape. In this embodiment, it is formed into an octahedral polygonal pyramid shape. The wedge portion 27a can be made of, for example, tool steel or super hard alloy. The taper angle of the wedge portion 27a is set to be the same as the taper angle of the wedge hole portion 23 of the die 20, for example, 1 to 30° (degree). In the present invention, however, it is not limited that the taper angle of the wedge portion 27a or that of the wedge hole portion 23 falls within the aforementioned range.

At the other end portion of the mandrel 27, a mandrel driving means (not illustrated) for moving the mandrel 27 in the insertion direction of inserting the wedge portion 27a of the mandrel 27 into the wedge hole portion 23 is connected. As the mandrel driving means, a hydraulic cylinder, for example, can be used.

Figure 5:
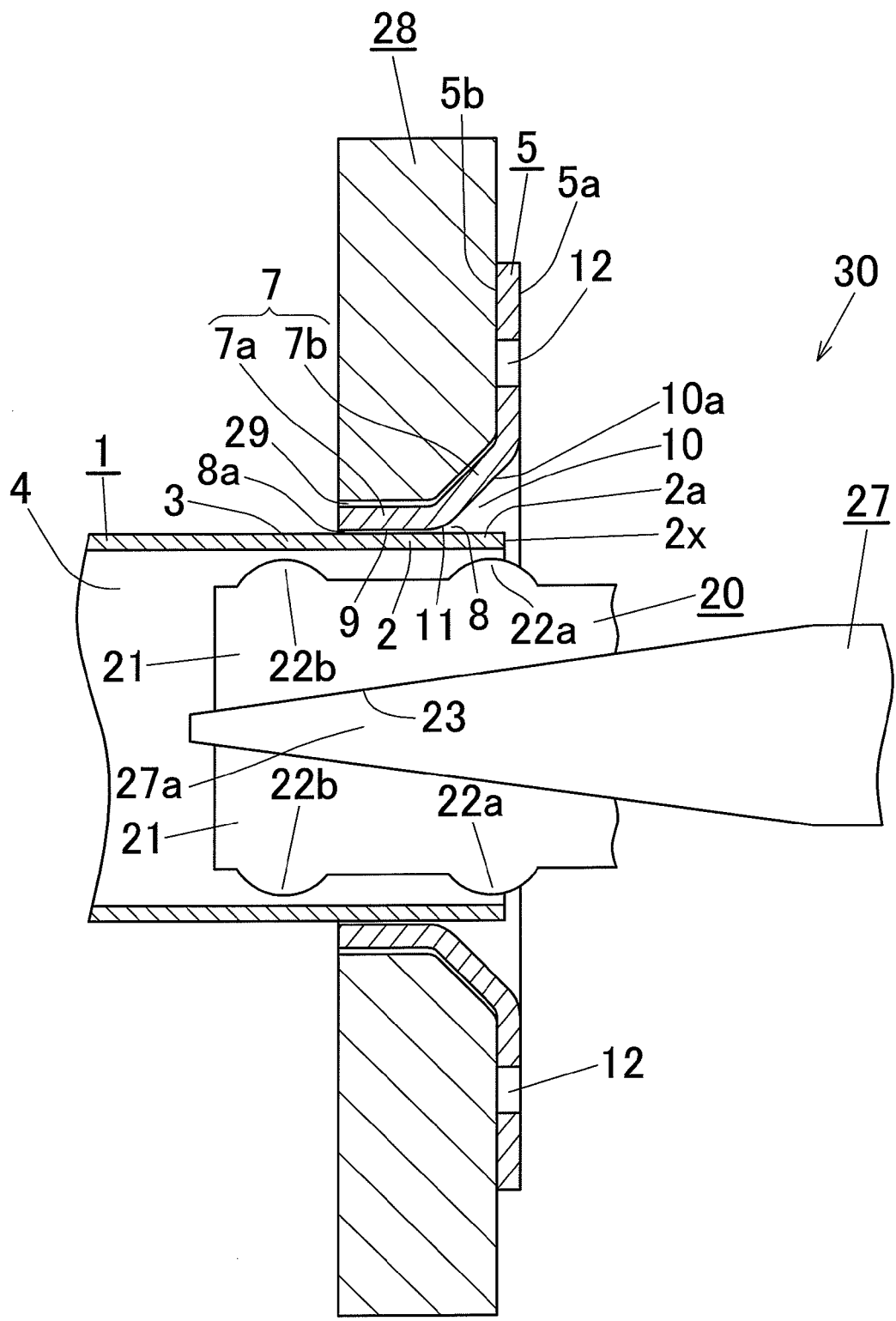
FIG. 5 is a cross-sectional view showing a state before subjecting the end portion of the pipe to an expanding process in the first embodiment.
Figure 6:
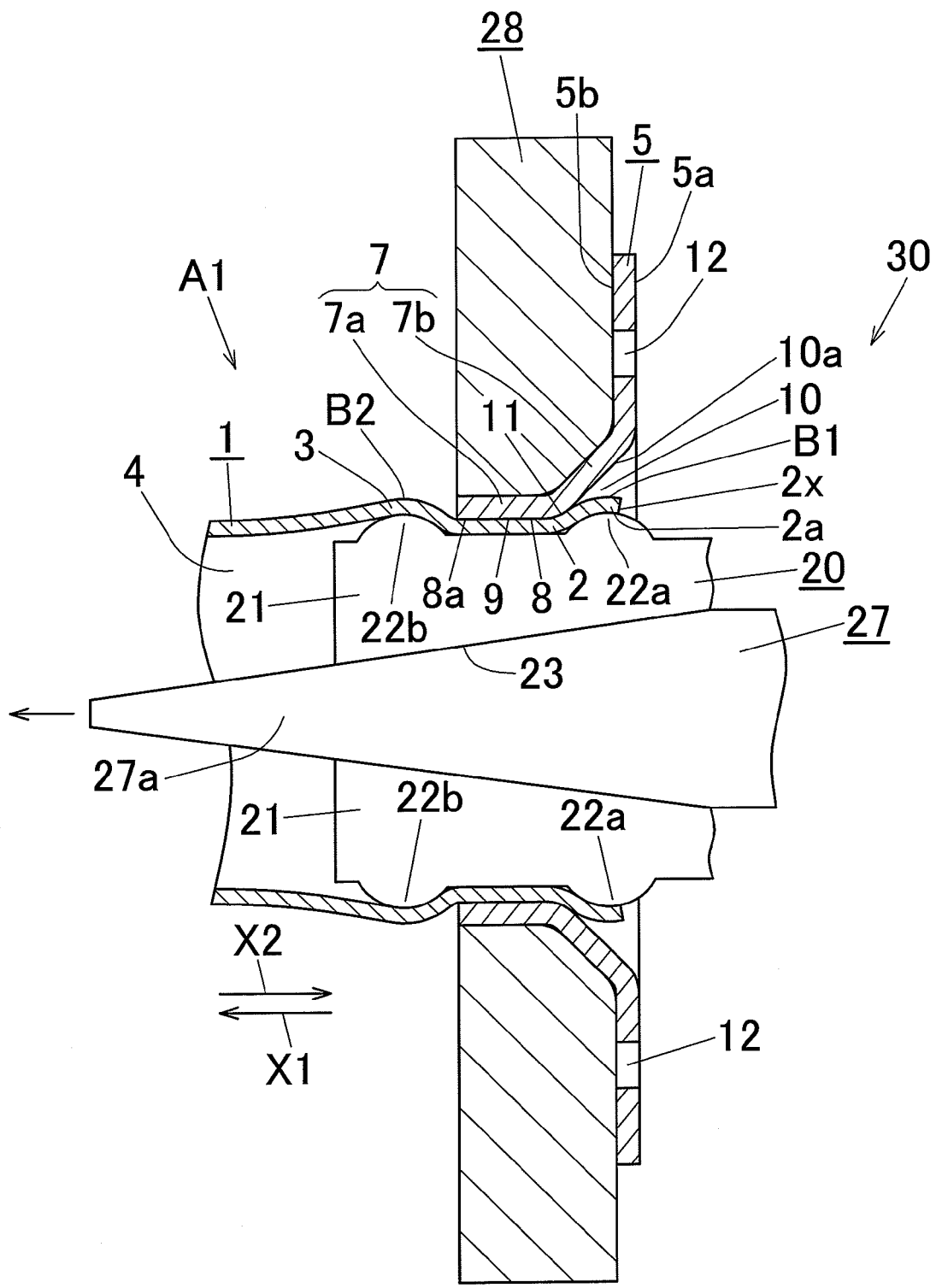
FIG. 6 is a cross-sectional view showing a state after subjecting the end portion of the pipe to an expanding process in the first embodiment.

The mandrel 27 is configured to move each die segment 21 of the die 20 radially outward of the pipe 1 by inserting the wedge portion 27a of the mandrel 27 into the wedge hole portion 23 of the die 20 disposed in the hollow portion 4 of the end portion 2 of the pipe 1 as shown in FIGS. 5 and 6.

Each die segment 21 of the die 20 is moved radially outward of the pipe 1 by the wedge portion 27a of the mandrel 27 to thereby subject the end portion 2 of the pipe 1 and the adjacent portion 3 thereof to an expanding process. These die segments 21 are the same in configuration and the same in structure with each other.

Each die segment 21 is integrally provided with a first pressing protruded portion 22a and the second pressing protruded portion 22b positioned apart from each other in the axial direction of the die 20. The first pressing protruded portion 22a and the second pressing protruded portion 22b each have a circular arc cross-sectional shape and are integrally formed on the outer peripheral surface of the die segment 21 (i.e., outer surface of the die segment 21 facing the pipe 1).

The protrusion height of the first pressing protruded portion 22a and that of the second pressing protruded portion 22b each are, for example, 0.5 to 10 mm. The width of the first pressing protruded portion 22a and that of the second pressing protruded portion 22b each are, for example, 2 to 20 mm.

In the present invention, however, it is not limited that the protrusion height and the width fall within the aforementioned respective ranges.

The first pressing protruded portion 22a is configured to locally protrude the end face portion 2a of the end portion 2 of the pipe 1 outwardly of the pipe 1 so that the end face portion 2a of the end portion 2 of the pipe 1 is engaged with the engaging dented portion 10 by locally pressing the end face portion 2a of the end portion 2 of the pipe 1 outwardly of the pipe 1 from the inner side of the pipe 1.

The second pressing protruded portion 22b is configured to locally protrude the adjacent portion 3 of the end portion 2 of the pipe 1 outwardly of the pipe 1 by locally pressing the adjacent portion 3 of the end portion 2 of the pipe 1 outwardly of the pipe 1 from the inner side of the pipe 1.

As shown in FIGS. 5 and 6, the restriction member 28 is configured to be disposed outside the cylindrical portion 7 of the flange 5 so as to surround the entire circumference of the cylindrical portion 7 to thereby control the outward expansion amount of the cylindrical portion 7 along the entire circumference of the cylindrical portion 7 to a predetermined expansion amount during the expanding process.

This restriction member 28 has a strength capable of preventing deformation of the restriction member 28 regardless of the load applied to the restriction member 28 during the expanding process, and can be made of, for example, tool steel.

Next, a method of manufacturing a flanged pipe A1 using a manufacturing device 30 of this first embodiment will be explained.

Initially, the aforementioned flange 5 is prepared [FLANGE PREPARATION STEP]. Further, a manufacturing device 30 equipped with the aforementioned expanding die 20 is prepared [DIE PREPARATION STEP].

Next, as shown in FIG. 5, the end portion 2 of the pipe 1 is inserted from the pipe insertion opening 8a into the pipe insertion hole 8 of the flange 5 so that the end face 2x of the pipe 1 is positioned within the range from the axially intermediate portion of the pipe insertion hole 8 to the position of the connecting surface 5a of the flange 5. This step is referred to as "PIPE INSERTION STEP." In this embodiment, the end face 2x of the pipe 1 is positioned adjacent to the position of the connecting surface 5a of the flange 5.

Furthermore, the die 20 is inserted into the hollow portion 4 of the end portion 2 of the pipe 1 through the end opening of the pipe 1 and positioned therein. Furthermore, the restriction member 28 is positioned on the outer side of the cylindrical portion 7 of the flange 5 in a state in which the restriction member 28 surrounds the cylindrical portion 7 along the entire circumference thereof and a gap 29 is formed between the restriction member 28 and the cylindrical portion along the entire circumference of the outer side of the cylindrical portion 7. This gap 29 corresponds to the expansion amount of the cylindrical portion 7 to be expanded by the expanding process, and is set to, for example, 0.1 to 1 mm. In the present invention, however, it is not limited that the gap 29 falls within the aforementioned range.

Next, the wedge portion 27a of the mandrel 27 is forcibly inserted into the wedge hole portion 23 of the die 20 with a mandrel driving means. With this, as shown in FIG. 6, each die segment 21 of the die 20 is moved radially outward of the pipe 1 to thereby simultaneously expand the end portion 2 of the pipe 1 and the adjacent portion 3. This step will be referred to as "EXPANDING PROCESS STEP."

By this expanding process, the end portion 2 of the pipe 1 is plastically deformed so as to expand outwardly of the pipe 1 and brought into pressure-contact with the inner peripheral surface 9 of the pipe insertion hole 8. Receiving this pressing force, the cylindrical portion 7 of the flange 5 is elastically deformed and expanded outwardly. This elastic deformation of the cylindrical portion 7 causes accumulation of an elastic restoring force (springback force) in the cylindrical portion 7. Reaching of the cylindrical portion 7 to the restriction member 28 restricts the outward expansion amount of the cylindrical portion 7. This prevents plastic deformation of the cylindrical portion 7 and breakage of the cylindrical portion 7.

Furthermore, at the time of this expanding process step, the end face portion 2a of the end portion 2 of the pipe 1 is locally pressed so as to expand outwardly of the pipe 1 (i.e., within the engaging dented portion 10) by the first pressing protruded portion 22a of each die segment 21 of the die 20 to be plastically deformed along the entire circumference thereof. With this, a first expanded portion B1 having a circular arc cross-sectional shape is formed at this end face portion 2a along the entire circumference thereof. At the same time, this first expanded portion B1 is engaged with the engaging dented portion 10 in the pull-out direction X1 of pulling out the end portion 2 of the pipe 1 from the pipe insertion hole 8 along the entire circumference of the pipe insertion hole 8.

Furthermore, at the time of the expanding process step, the adjacent portion 3 of the end portion 2 of the pipe 1 is pressed outwardly of the pipe 1 by the second pressing protruded portion 22b of each die segment 21 of the die 20 to be plastically deformed along the entire circumference thereof. With this, a second expanded portion B2 having a circular arc cross-sectional shape is formed at the adjacent portion 3 along the entire circumference thereof, and this second expanded portion B2 is engaged with the tip end of the cylindrical portion 7 in the insertion direction X2 of inserting the end portion 2 of the pipe 1 into the pipe insertion hole 8.

Next, the wedge portion 27a of the mandrel 27 is pulled out of the wedge hole portion 23 of the die 20. With this, by the elastic restoring force accumulated in the cylindrical portion 7 of the flange 5, the inner peripheral surface 9 of the pipe insertion hole 8 is pressed against the outer peripheral surface of the end portion 2 of the pipe 1 and secured thereto. Thus, the flange 5 is fixedly secured to the end portion 2 of the pipe 1. Thereafter, the die 20 is pulled out of the hollow portion 4 of the pipe 1.

Figure 2:
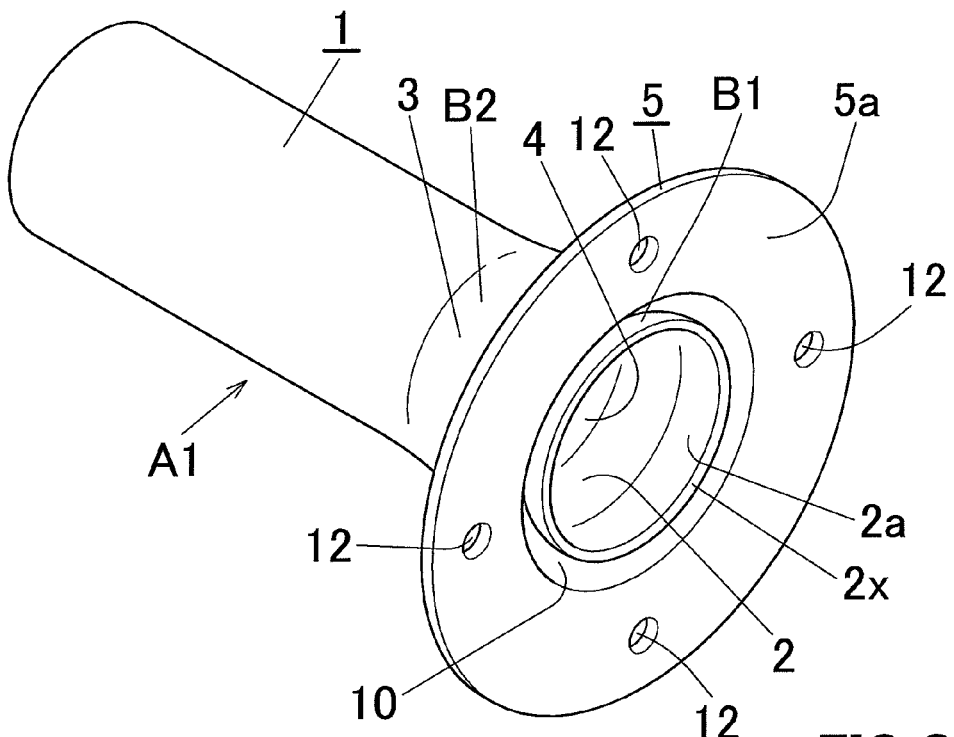
FIG. 2 is a perspective view of the flanged pipe as seen from another direction.

Following the aforementioned steps, a flanged pipe A1 shown in FIGS. 1 and 2 is manufactured.

Thus, the manufacturing method of the flanged pipe A1 according to the first embodiment has the following advantages.

At the expanding process step, the end portion 2 of the pipe 1 is subjected to an expanding process so that the end portion 2 of the pipe 1 is engaged with the engaging dented portion 10 of the inner peripheral surface 9 of the pipe insertion hole 8 in the pull-out direction X1 of pulling out the end portion 2 of the pipe 1 from the pipe insertion hole 8. This increases the pull-out strength of the pipe 1 to the flange 5.

Furthermore, the expanding process is performed in a state in which the end portion 2 of the pipe 1 is inserted in the pipe insertion hole 8 of the flange 5 such that the end face 2x of the pipe 1 is positioned within the range from the axially intermediate portion of the pipe insertion hole 8 to the position of the connecting surface 5a of the flange 5. Therefore, as shown in FIG. 3, in connecting the flange 5 to which the end portion 2 of the pipe 1 is connected to another member 50, the end face portion 2a of the end portion 2 of the pipe 1 does not interfere with another member 50. This results in preferable connection of the flange 5 to another member 50.

Furthermore, the engaging dented portion 10 is formed along the entire circumference of the pipe insertion hole 8, and the end portion 2 of the pipe 1 is subjected to the expanding process so that the end portion 2 of the pipe 1 is engaged with the engaging dented portion 10 along the entire circumference of the pipe insertion hole 8. Therefore, the pull-out strength of the pipe 1 to the flange 5 can be increased assuredly.

Furthermore, the engaging dented portion 10 is formed at the connecting surface 5a side of the flange 5 of the inner peripheral surface 9 of the pipe insertion hole 8 so as to open toward the inner side of the pipe insertion hole 8 and the connecting surface 5a side of the flange 5. Therefore, the engaging dented portion 10 can be formed easily.

Furthermore, since the flange 5 is integrally provided with the cylindrical portion 7 having a hollow portion as the pipe insertion hole 8, the contact area between the end portion 2 of the pipe 1 and the flange 5 can be increased, and the weight increase of the flange 5 can be prevented effectively. By this, the joint strength between the pipe 1 and the flange 5 can be increased, and the flanged pipe A1 can be reduced in weight.

The flange 5 and the cylindrical portion 7 are integrally formed by pressing a metal plate, and therefore a flange 5 having a cylindrical portion 7 can be easily manufactured at low cost.

By subjecting the end portion 2 of the pipe 1 to an expanding process in a state in which the end portion 2 of the pipe 1 is inserted in the pipe insertion hole 8 of the flange 5 and the outward expansion amount of the cylindrical portion 7 is controlled by the restriction member 28 arranged on the outer side of the cylindrical portion 7, possible plastic deformation of the cylindrical portion 7 during the expanding process can be prevented, and possible breakage of the cylindrical portion 7 can also be prevented. This enables assured accumulation of elastic restoring force in the cylindrical portion 7, which in turn can enhance the joint strength between the flange 5 and the end portion 2 of the pipe 1 assuredly.

Second Embodiment

FIGS. 7-11 are explanatory views of a manufacturing method and a manufacturing device 30 of a flanged pipe A2 according to a second embodiment of the present invention. The manufacturing method and the manufacturing device 30 will be explained below focusing on the points different from the first embodiment.

Figure 7:
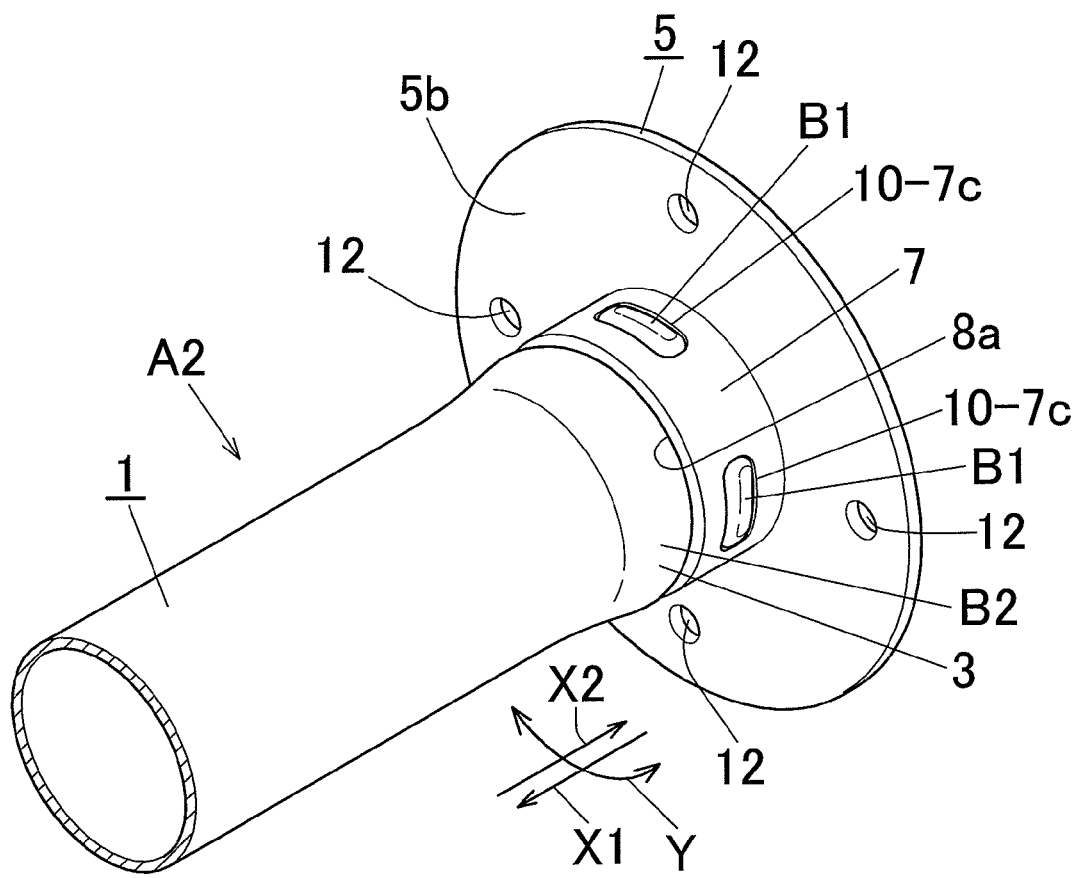
FIG. 7 is a perspective view of a flanged pipe according to a second embodiment of the present invention.
Figure 8:
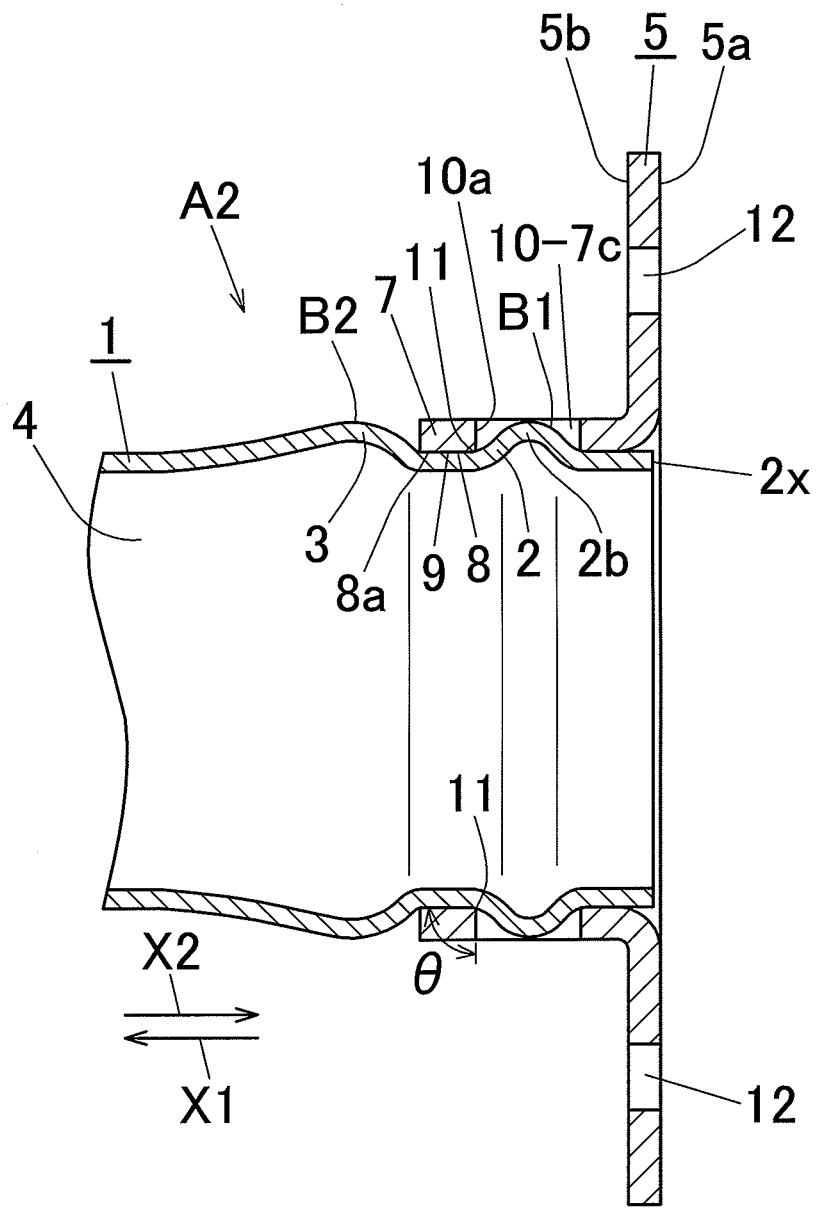
FIG. 8 is a cross-sectional view of the flanged pipe.

In FIG. 7, "A2" denotes a flanged pipe manufactured by the manufacturing device 30 of this second embodiment. In this flanged pipe A2, as shown in FIGS. 7 and 8, the flange 5 and the cylindrical portion 7 are integrally formed by a press work of a metal plate.

The cylindrical portion 7 of the flange 5 is formed into a cylindrical shape along the entire longitudinal area in the axial direction thereof. Therefore, no engaging dented portion is formed at the connecting surface 5a side of the flange 5 on the inner peripheral surface 9 of the pipe insertion hole 8.

On the other hand, the cylindrical portion 7 of the flange 5 has at its axial intermediate portion thereof a plurality of through-holes 7c penetrated in the thickness direction of the cylindrical portion 7 (that is, in the radial direction of the cylindrical portion 7) and arranged at equal intervals in the circumferential direction of the pipe insertion hole 8. In this embodiment, the number of the through-holes 7c is four. Each through-hole 7c extends in the circumferential direction of the pipe insertion hole 8. The through-hole 7c was formed in the axial intermediate portion of the cylindrical portion 7 with a punch (not illustrated). By forming each through-hole 7c in the axially intermediate portion of the cylindrical portion 7, a plurality of engaging dented portions 10 are formed at the axially intermediate portion of the pipe insertion hole 8 at equal intervals in the circumferential direction of the pipe insertion hole 8. As explained above, each engaging dented portion 10 is formed by each through-hole 7c.

No chamfering is made on the angular portion 11 between the inner peripheral surface 9 of the pipe insertion hole 8 and the inner side surface 10a of each engaging dented portion 10 of the flange 5 along the entire circumference of the engaging dented portion 10. Thus, the angular portion 11 is angular. In detail, no chamfering is made on this angular portion 11, and therefore "C" of the angular portion 11 falls within the range of 0 to 0.5 mm. Since "C" falls within this range, the angular portion 11 is angular. "C" of the angular portion 11 means the chamfering size C when the angular portion 11 is subjected to C chamfering. The cross-sectional angle $\theta$ of this angular portion 11 is set to 90° (i.e., $\theta$=90°). In this invention, it is not limited that the cross-sectional angle of the angular portion 11 is 90°. It is preferably less than 90°, more preferably within the range of, for example, 80° to 90°.

In this flanged pipe A2, the end portion 2 of the pipe 1 is inserted into the pipe insertion hole 8 of the flange 5 from the pipe insertion opening 8a so that the end face 2x of the pipe 1 is positioned within the range from the axially intermediate portion of the pipe insertion hole 8 to the position of the connecting face 5a of the flange 5. The end portion 2 of the pipe 1 is expanded so that an axially intermediate portion 2b of the end portion 2 of the pipe 1 is expanded in each engaging dented portion 10, whereby the end portion 2 of the pipe 1 is engaged with each engaging dented portion 10 in the pull-out direction X1 of pulling out the end portion 2 of the pipe 1 from the pipe insertion hole 8, in the insertion direction X2 of inserting the end portion 2 of the pipe 1 into the pipe insertion hole 8, and in the circumferential direction Y of the pipe insertion hole 8. Furthermore, the adjacent portion 3 of the end portion 2 of the pipe 1 positioned opposite to the end face 2x of the pipe 1 is expanded along the entire circumference thereof.

That is, the axially intermediate portion 2b of the end portion 2 of the pipe 1 is provided with a plurality of (four in this embodiment) pull-out preventing first expanded portions B1 expanded locally outward of the pipe 1 by the expanding process and arranged at equal intervals in the circumferential direction of the pipe 1. Each first expanded portion B1 is positioned within each engaging dented portion and engaged with each engaging dented portion 10 in the aforementioned three directions (i.e., the pull-out direction X1, the insertion direction X2, and the circumferential direction Y).

Furthermore, at the adjacent portion 3 of the end portion 2 of the pipe 1, a pull-out preventing second expanded portion B2 locally expanded outwardly of the pipe 1 by an expanding process is formed along the entire circumference of the pipe 1. This second expanded portion B2 is engaged with the tip end of the cylindrical portion 7 of the flange 5 in the insertion direction X2 of inserting the end portion 2 of the pipe 1 into the pipe insertion hole 8.

The connecting method of this flanged pipe A2 and another member is the same as in the first embodiment (see FIG. 3).

Figure 9:
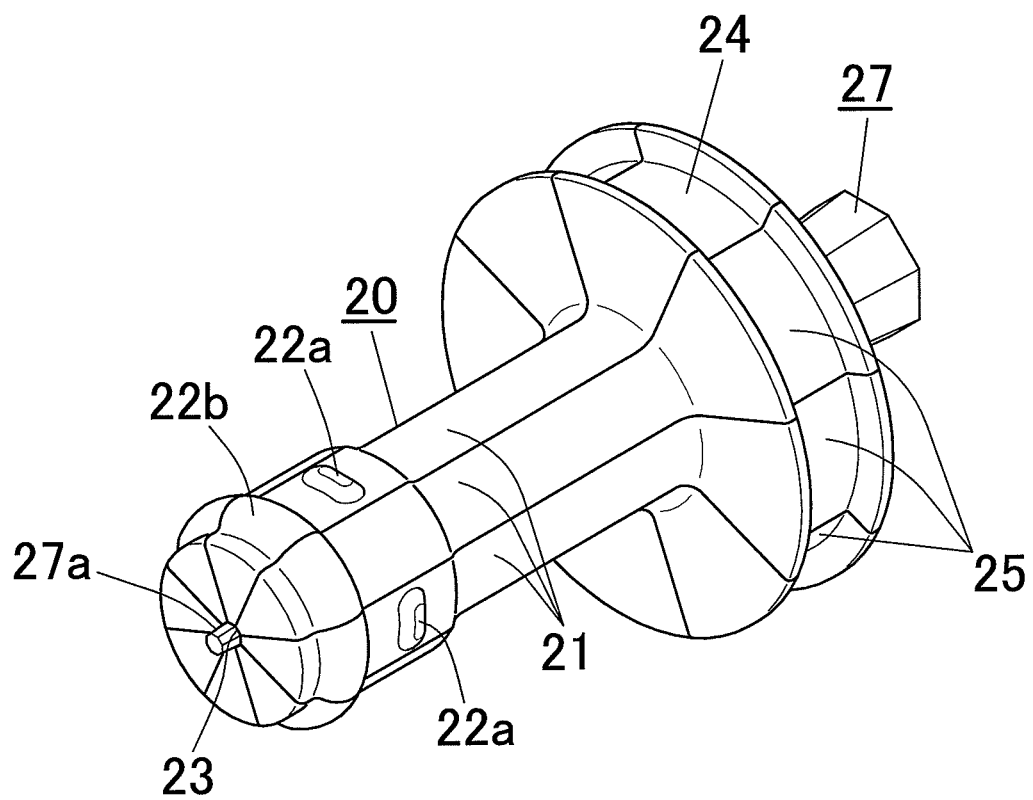
FIG. 9 is a perspective view showing an expanding die and a mandrel of a flanged pipe manufacturing device according to the second embodiment.

In the manufacturing device 30 of this second embodiment, as shown in FIG. 9, four die segments 21 of the expanding die 20 among eight die segments each are integrally with a first pressing protruded portion 22a configured to locally expand the axially intermediate portion 2b of the end portion 2 of the pipe 1 outwardly of the pipe 1 by locally pressing the axially intermediate portion 2b of the end portion 2 of the pipe 1 outwardly of the pipe 1 from the inner side of the pipe 1. The die segments 21 each integrally provided with the first pressing protruded portion 22a among the eight die segments 21 are arranged every other in the circumferential direction of the die 20. The remaining four die segments 21 have no first pressing protruded portions 22a.

The other structure of this manufacturing device 30 is the same as that of the first embodiment.

Next, a method of manufacturing the flanged pipe A2 using the manufacturing device 30 of this second embodiment will be explained below with reference to FIGS. 10 and 11.

Figure 10:
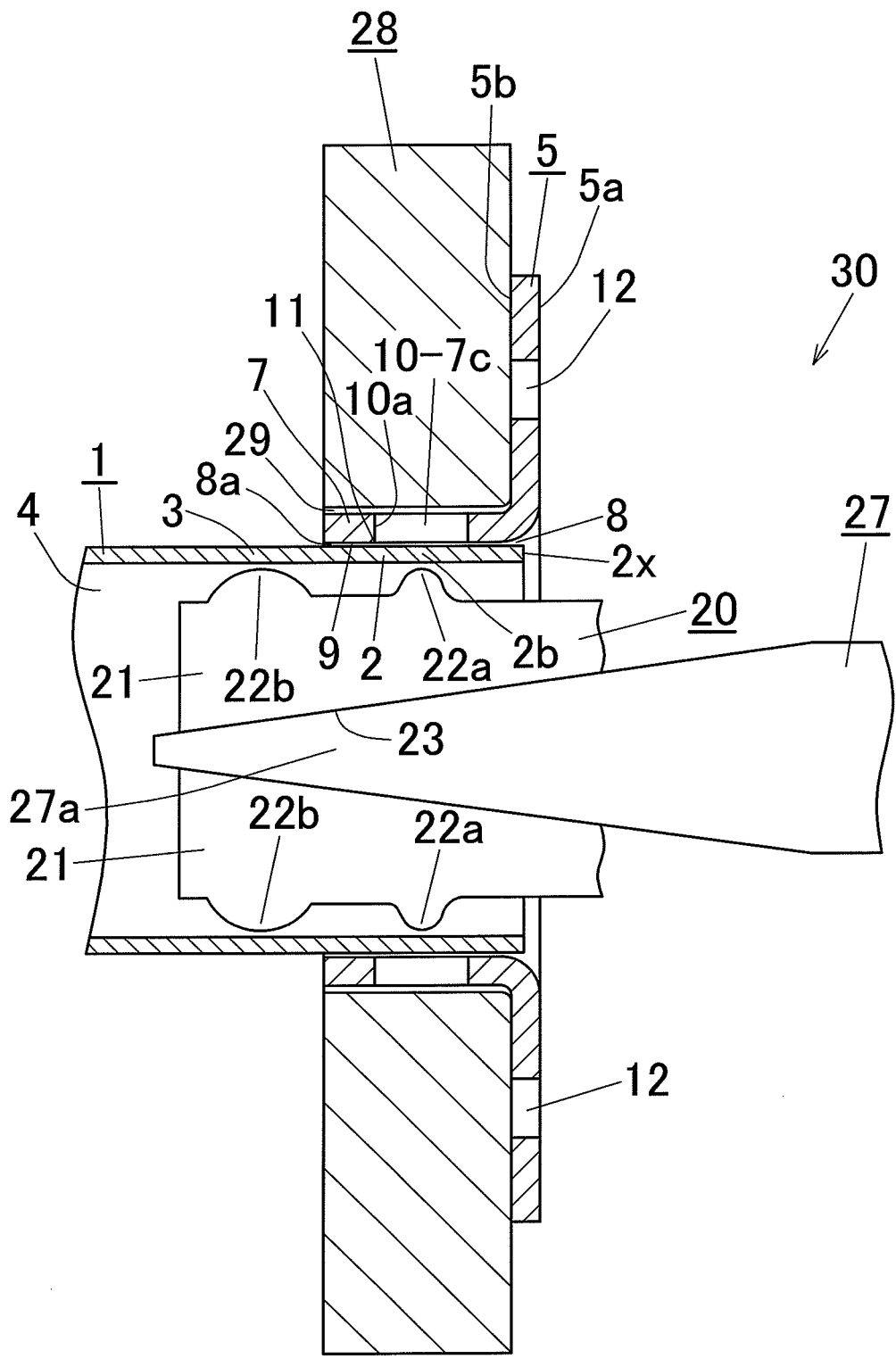
FIG. 10 is a cross-sectional view showing a state before subjecting the end portion of the pipe to an expanding process in the second embodiment.
Figure 11:
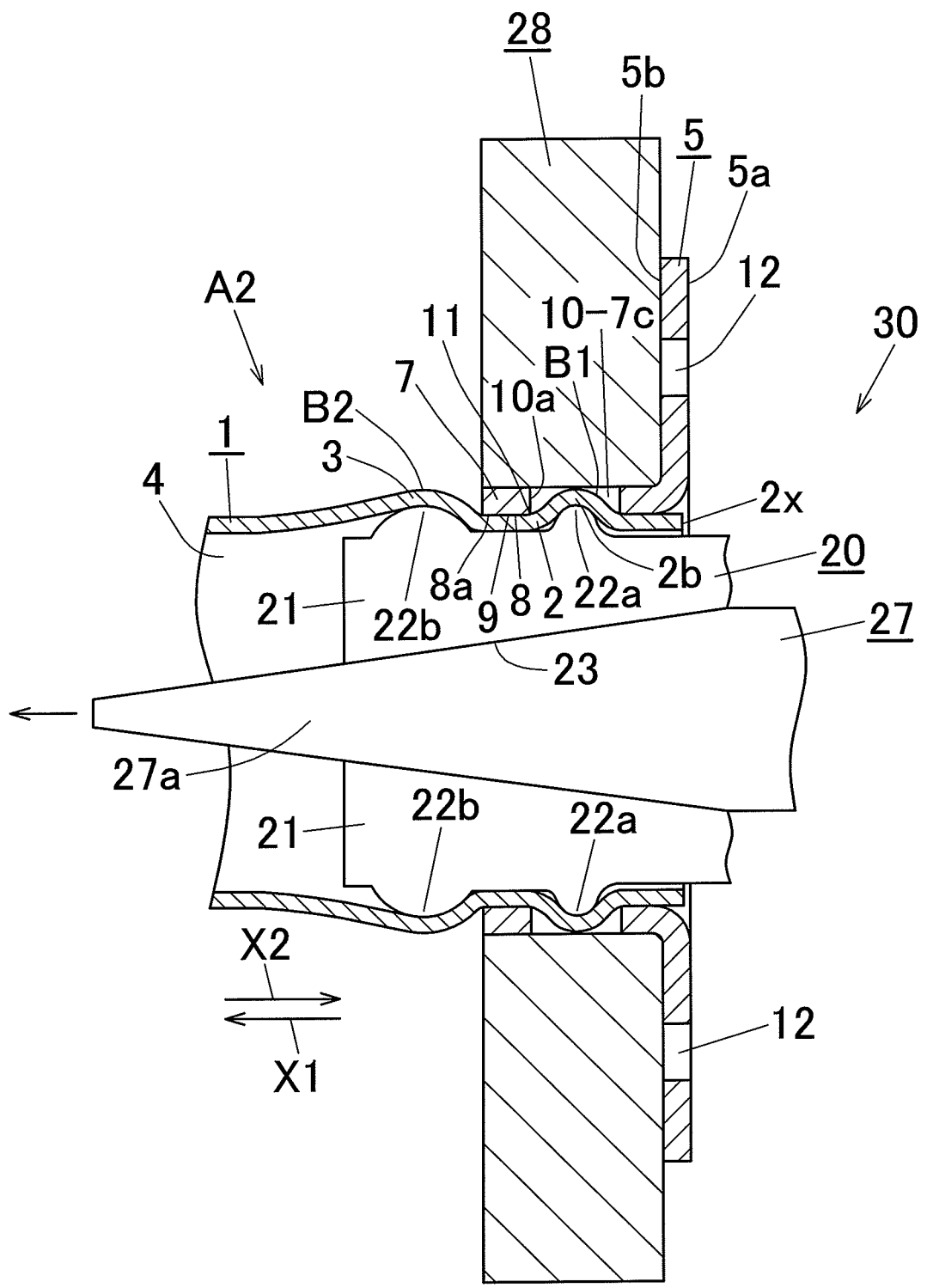
FIG. 11 is a cross-sectional view showing a state after subjecting the end portion of the pipe to an expanding process in the second embodiment.

As shown in FIG. 10, in the same manner as in the first embodiment, the end portion 2 of the pipe 1 is inserted into the pipe insertion hole 8 of the flange 5 from the pipe insertion opening 8a so that the end face 2x of the pipe 1 is positioned within the range from the axially intermediate portion of the pipe insertion hole 8 to the position of the connecting surface 5a of the flange 5 [PIPE INSERTION STEP]. Further, the die 20 is disposed in the hollow portion 4 of the end portion 2 of the pipe 1. The restriction member 28 is disposed outwardly of the cylindrical portion 7 of the flange 5.

Next, the wedge portion 27a of the mandrel 27 is forcibly inserted into the wedge hole portion 23 of the die 20 with mandrel driving means. With this, as shown in FIG. 11, each die segment 21 of the die 20 is moved radially outward of the pipe 1 to simultaneously subject the end portion 2 of the pipe 1 and the adjacent portion 3 to an expanding process [EXPANDING PROCESS STEP].

By this expanding process step, the axially intermediate portion 2b of the end portion 2 of the pipe 1 is pressed by the first pressing protruded portion 22a of the each die segment 21 of the die 20 so as to expand toward each engaging dented portion 10, to be locally plastically deformed. With this, four first expanded portions B1 are formed on this portion 2b at equal intervals in the circumferential direction of the pipe 1, and each first expanded portion B1 is engaged with each engaging dented portion 10 in the pull-out direction X1 of pulling out the end portion 2 of the pipe 1 from the pipe insertion hole 8, in the insertion direction X2 of inserting the end portion 2 of the pipe 1 into the pipe insertion hole 8, and in the circumferential direction Y of the pipe insertion hole 8.

Furthermore, by this expanding process step, a second expanded portion B2 is formed at the adjacent portion 3 of the end portion 2 of the pipe 1 along the entire circumference of the pipe 1 by the second pressing protruded portion 22b of each die segment 21 of the die 20, and the second protruded portion B2 is engaged with the tip end of the cylindrical portion 7 of the flange 5 in insertion direction X2 of inserting the end portion 2 of the pipe 1 into the pipe insertion hole 8.

Through the aforementioned steps, the flanged pipe A2 shown in FIGS. 7 and 8 is manufactured.

The manufacturing method of the flanged pipe A2 of the second embodiment has the following advantages.

At the expanding process step, by subjecting the end portion 2 of the pipe 1 to an expanding process so that the end portion 2 of the pipe 1 is engaged with each engaging dented portion 10 in the circumferential direction of the pipe insertion hole 8, in addition to the pull-out strength of the pipe 1 to the flange 5, the joint strength of the pipe 1 to the flange 5 in the rotational direction Y can also be increased.

Furthermore, the angular portion 11 between the inner peripheral surface 9 of the pipe insertion hole 8 of the flange 5 and the inner side surface 10a of each engaging dented portion 10 is angular, and the cross-sectional angle θ is set to 90°. Therefore, the pull-out prevention of the pipe 1 can be attained by this angular portion 11. That is, when a load is applied to the pipe 1 in the pull-out direction X1 with respect to the flange 5, the angular portion 11 is assuredly engaged with the outer surface of the first expanded portion B1 of the pipe 1, which prevents pulling-out of the pipe 1. As a result, the pull-out strength of the pipe 1 to the flange 5 can be further enhanced.

Furthermore, in this flanged pipe A2, a plurality of through-holes 7c penetrated in the thickness direction of the cylindrical portion 7 are formed in the axially intermediate portion of the cylindrical portion 7 of the flange 5 at intervals in the circumferential direction, and each engaging dented portion 10 is formed by each through-hole 7c, and therefore there are following advantages. That is, the through-hole 7c forming the engaging dented portion 10 can be easily formed by punching the axially intermediate portion of the cylindrical portion 7 of the flange 5 with a punch in such a manner that the angular portion 11 between the inner peripheral surface 9 of the pipe insertion hole 8 and the inner side surface 10a of the engaging dented portion 10 is angular. Furthermore, the cross-sectional angle θ of the angular portion 11 can be easily set to 90°.

Furthermore, the end portion 2 of the pipe 1 can be engaged with each engaging dented portion 10 in the pull-out direction X1 of pulling out the end portion 2 of the pipe 1 from the pipe insertion hole 8, in insertion direction X2 of inserting the end portion 2 of the pipe 1 into the pipe insertion hole 8, and in the circumferential direction of the pipe insertion hole 8. Therefore, the joint strength of the pipe 1 to the flange 5 in the pull-out direction X1 (i.e., the pull-out strength of the pipe 1), the joint strength of the pipe 1 to the flange 5 in the insertion direction X2, and the joint strength of the pipe 1 to the flange 5 in the rotational direction Y can be enhanced.

In the present invention, it is not limited that the number of the engaging dented portions 10 and that of the through-holes 7c are four. The number can be variously changed, and can be, for example, 2 to 16.

Third Embodiment

Figure 12:
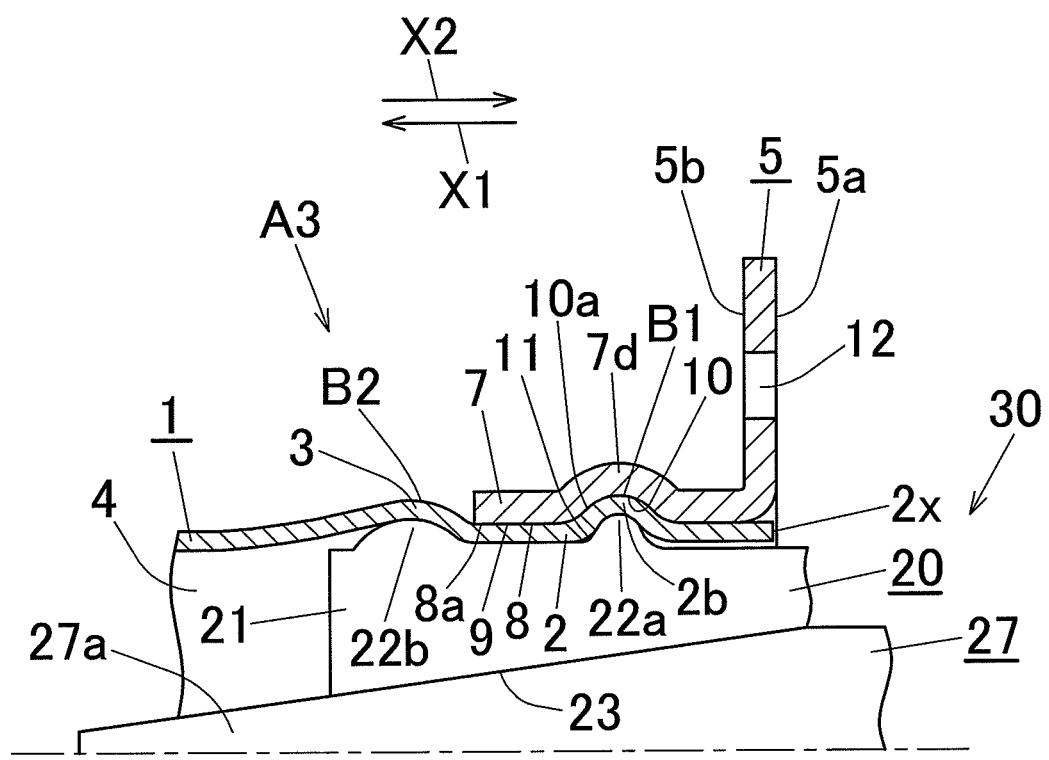
FIG. 12 is a half cross-sectional view showing a state after subjecting the end portion of the pipe to an expanding process by the flanged pipe manufacturing method according to a third embodiment of the present invention.

FIG. 12 is an explanatory view showing a manufacturing method of a flanged pipe A3 according to a third embodiment of the present invention. This manufacturing method will be explained below focusing on the points different from the first and second embodiments.

In the third embodiment, the axially intermediate portion of the cylindrical portion 7 of the flange 5 is provided with a plurality of bent portions 7d (bead portions) each having a circular-arc cross-sectional shape bent inwardly of the cylindrical portion 7 on the inner surface of the cylindrical portion 7 in a concave manner and bent outwardly of the cylindrical portion 7 on the outer surface of the cylindrical portion 7 in a convex manner at intervals in the circumferential direction of the pipe insertion hole 8. Thus, a plurality of engaging dented portions 10 formed by the inner side concave portions of the plurality of bent portions 7d are formed on the inner peripheral surface 9 of the pipe insertion hole 8 of the flange 5 at intervals in the circumferential direction of the pipe insertion hole 8. The number of the bent portions 7d and that of the engaging dented portions 10 each are, for example, four. The bent portion 7d is formed by subjecting the axially intermediate portion of the cylindrical portion 7 of the flange 5 to press work.

Furthermore, the angular portion 11 of the flange 5 between the inner peripheral surface 9 of the pipe insertion hole 8 and the inner side surface 10a of each engaging dented portion 10 is formed into a round shape along the entire circumference of the engaging dented portion 10. In other words, this angular portion 11 is formed into a circular-arc cross-sectional shape. Furthermore, the cross-sectional angle of this angular portion 11 is formed to be larger than 90°.

The flanged pipe A3 is manufactured by the same method as the manufacturing method of the flanged pipe A2 of the second embodiment. Although not illustrated in FIG. 12, restriction member is preferably arranged outside the cylindrical portion 7 of the flange 5 during the expanding process.

In this flanged pipe A3, at an axially intermediate portion 2b of the end portion 2 of the pipe 1, four first expanded portions B1 locally expanded outwardly of the pipe 1 by an expanding process are formed at equal intervals in the circumferential direction of the pipe 1. Each first expanded portion B1 is disposed in each engaging dented portion 10, whereby each first expanded portion B1 is engaged with each engaging dented portion 10 in the pull-out direction X1 of pulling out the end portion 2 of the pipe 1 from the pipe insertion hole 8, in insertion direction X2 of inserting the end portion 2 of the pipe 1 into the pipe insertion hole 8, and in the circumferential direction Y of the pipe insertion hole 8.

Furthermore, at the adjacent portion 3 of the end portion 2 of the pipe 1, a second expanded portion B2 locally expanded outwardly of the pipe 1 is formed along the entire circumference of the pipe 1 by the expanding process. This second expanded portion B2 is engaged with the tip end of the cylindrical portion 7 of the flange 5 in the insertion direction X2 of inserting the end portion 2 of the pipe 1 into the pipe insertion hole 8.

In the aforementioned third embodiment, the plurality of bent portions 7d for forming the plurality of engaging dented portions 10 are formed at intervals in the circumferential direction of the pipe insertion hole 8. In the present invention, however, it can be configured, for example, such that the number of the bent portion 7d is one and this bent portion 7d is formed at the axially intermediate portion of the cylindrical portion 7 of the flange 5 along the entire peripheral direction of the pipe insertion hole 8 and therefore the engaging dented portion 10 is formed at the axially intermediate portion of the inner peripheral surface 9 of the pipe insertion hole 8 along the entire circumferential direction of the pipe insertion hole 8. In this case, the end portion 2 of the pipe 1 is subjected to an expanding process so that the end portion 2 is engaged with the engaging dented portion 10 along the entire circumferential direction of the pipe insertion hole 8 in the pull-out direction X1 of pulling out the end portion 2 of the pipe 1 from the pipe insertion hole 8 and in insertion direction X2 of inserting the end portion 2 of the pipe 1 into the pipe insertion hole 8.

Fourth Embodiment

Figure 13:
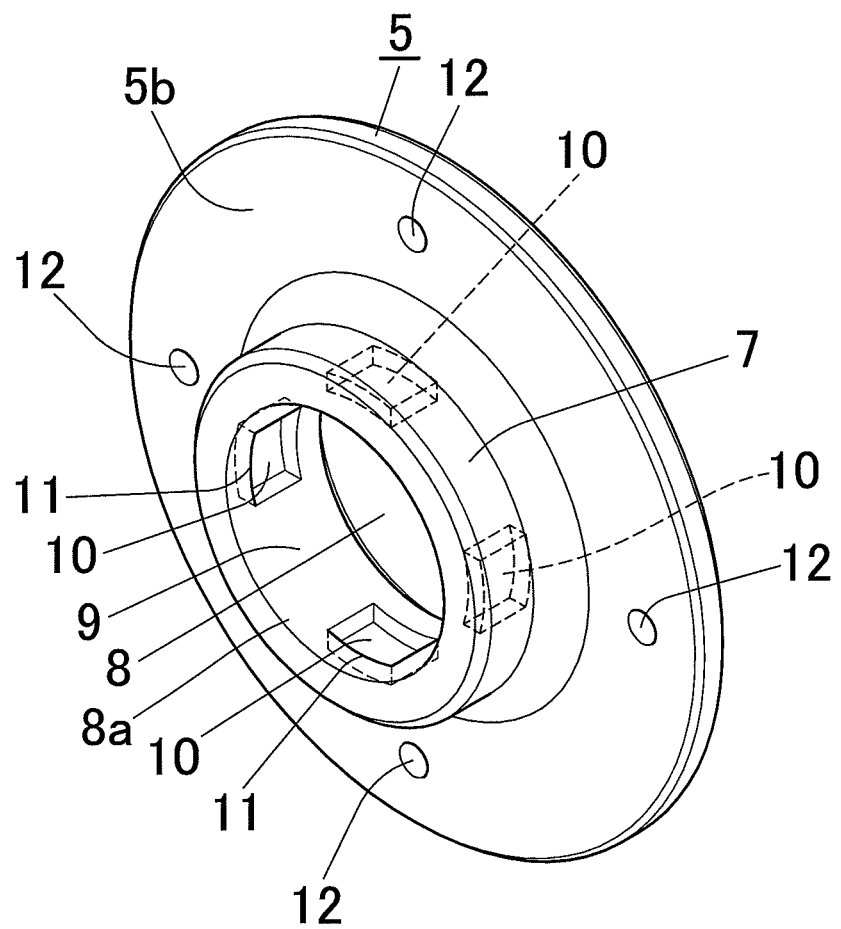
FIG. 13 is a perspective view of a flange of a flanged pipe according to a fourth embodiment of the present invention.
Figure 14:
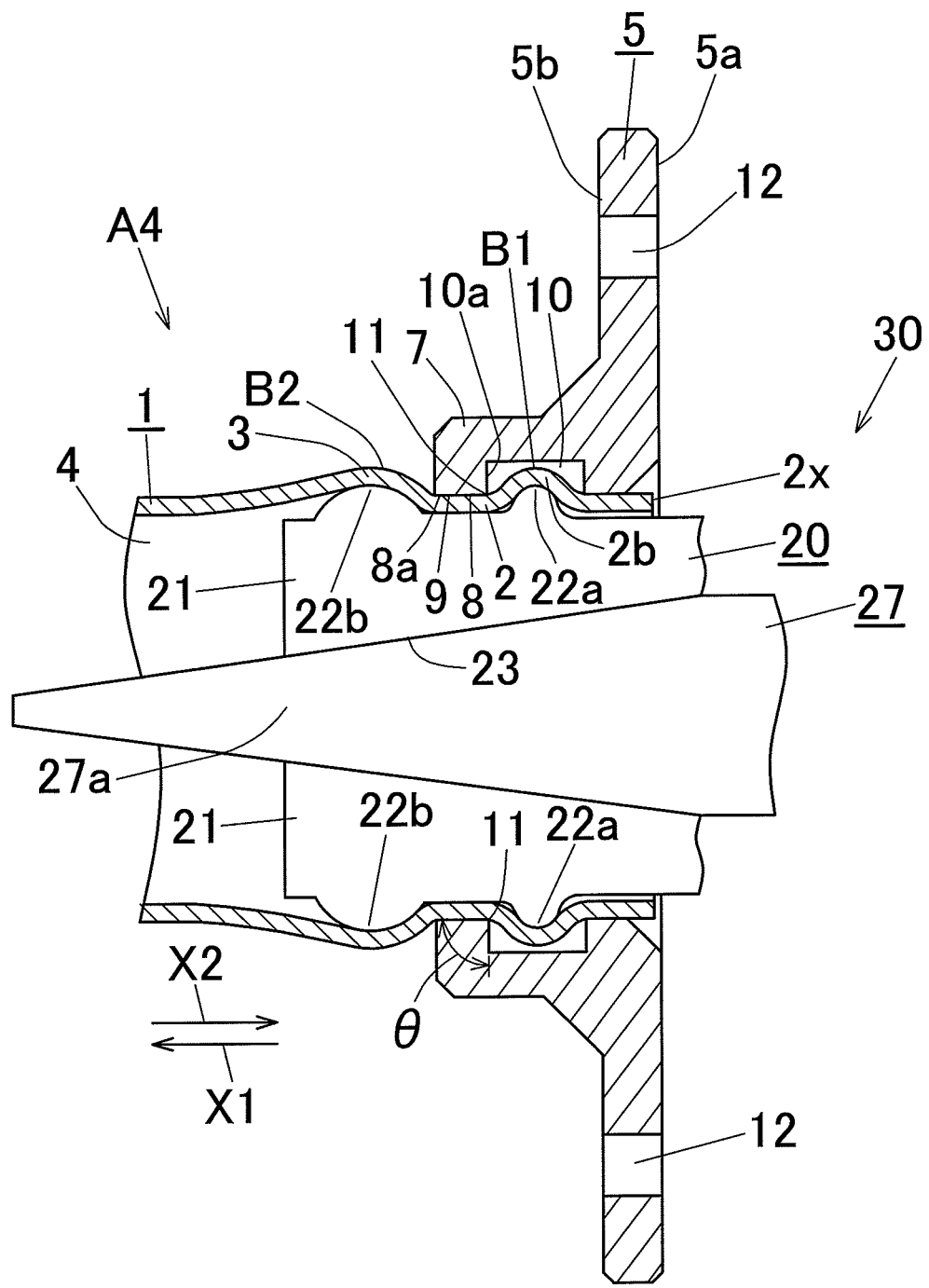
FIG. 14 is a cross-sectional view showing a state after subjecting the end portion of the pipe to an expanding process in the fourth embodiment.

FIGS. 13 and 14 are explanatory views showing a manufacturing method of the flanged pipe A4 according to a fourth embodiment of the present invention. This manufacturing method will be explained below focusing on the points different from the first and second embodiments.

In this fourth embodiment, the flange 5 with cylindrical portion 7 is a member not formed by subjecting a metal plate to press work, but is a member formed by subjecting a forged member, an extruded member or a die-cast member as a raw material to cutting work, or a member formed by a die-cast method.

As shown in FIG. 13, at the axially intermediate portion of the pipe insertion hole 8 on the inner peripheral surface 9 of the pipe insertion hole 8 of the flange 5, a plurality of engaging dented portions 10 are formed at intervals in the circumferential direction of the pipe insertion hole 8. The number of the engaging dented portions 10 is, for example, four. Each engaging dented portion 10 is formed by, for example, cutting work.

Furthermore, as shown in FIG. 14, no chamfering is made on each angular portion 11 between the inner peripheral surface 9 of the pipe insertion hole 8 of the flange 5 and the inner side surface 10a of each engaging dented portion 10. Therefore, this angular portion 11 is angular. The cross-sectional angle θ of this angular portion 11 is set to 90° (that is, θ=90).

This flanged pipe A4 is made by the same manufacturing method as that of the flanged pipe A2 of the second embodiment. Although not illustrated in FIG. 14, a restriction member is preferably arranged outside the cylindrical portion 7 of the flange 5 during the expanding process.

In this flanged pipe A4, at the axially intermediate portion 2b of the end portion 2 of the pipe 1, four first expanded portions B1 locally expanded outwardly of the pipe 1 are formed by an expanding process at equal intervals in the circumferential direction of the pipe 1. Each first expanded portion B1 is disposed in each engaging dented portion 10, so that each first expanded portion B1 is engaged with each engaging dented portion 10 in the pull-out direction X1 of pulling out the end portion 2 of the pipe 1 from the pipe insertion hole 8, in insertion direction X2 of inserting the end portion 2 of the pipe 1 into the pipe insertion hole 8, and in the circumferential direction Y of the pipe insertion hole 8.

Furthermore, at the adjacent portion 3 of the end portion 2 of the pipe 1, a second expanded portion B2 locally expanded outwardly of the pipe 1 along the entire circumference of the pipe 1 is formed by the expanding process. The second expanded portion B2 is engaged with the tip end of the cylindrical portion 7 of the flange 5 in the insertion direction X2 of inserting the end portion 2 of the pipe 1 into the pipe insertion hole 8.

Figure 15:
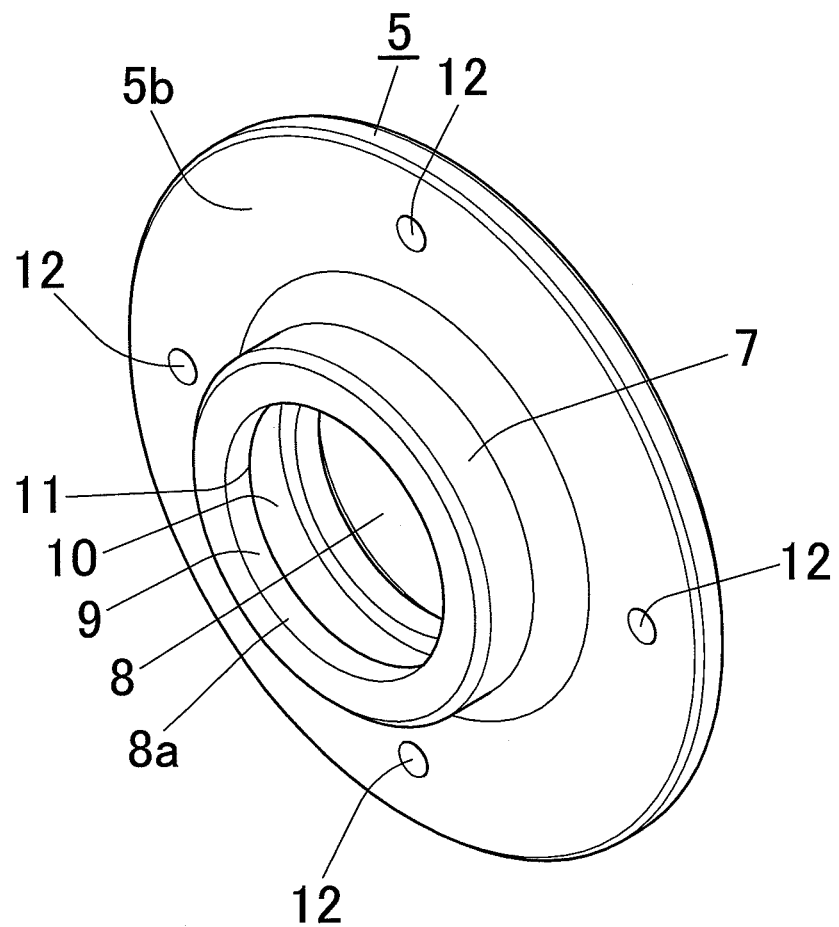
FIG. 15 is a perspective view showing a modification of the flange of the flanged pipe according to the fourth embodiment.

FIG. 15 is a perspective view showing a modified embodiment of the flange 5 of the flanged pipe A4 according to the fourth embodiment.

In the flange 5 of this modified embodiment, a single engaging dented portion 10 is formed at the axially intermediate portion of the pipe insertion hole 8 on the inner peripheral surface 9 of the pipe insertion hole 8 along the entire circumferential direction of the pipe insertion hole 8. The engaging dented portion 10 is formed by, for example, cutting work.

Further, no chamfering is made on each of the angular portions 11 between the inner peripheral surface 9 of the pipe insertion hole 8 of the flange 5 and the inner side surface of the engaging dented portion 10. Therefore, the angular portion 11 is angular. Furthermore, the cross-sectional angle of this angular portion 11 is set to 90°.

When joining the flange 5 to the end portion 2 of the pipe 1, the joining can be performed by using the die 20 of the manufacturing device 30 of the aforementioned first embodiment or the die 20 of the manufacturing device 30 of the aforementioned second embodiment. By this joining work, the end portion 2 of the pipe 1 is expanded so that the end portion 2 of the pipe 1 is engaged with the engaging dented portion 10 along the entire circumferential direction of the pipe insertion hole 8 in the pull-out direction X1 of pulling out the end portion 2 of the pipe 1 from the pipe insertion hole 8, and in the insertion direction X2 of inserting the end portion 2 of the pipe 1 into the pipe insertion hole 8.

Fifth Embodiment

Figure 16:
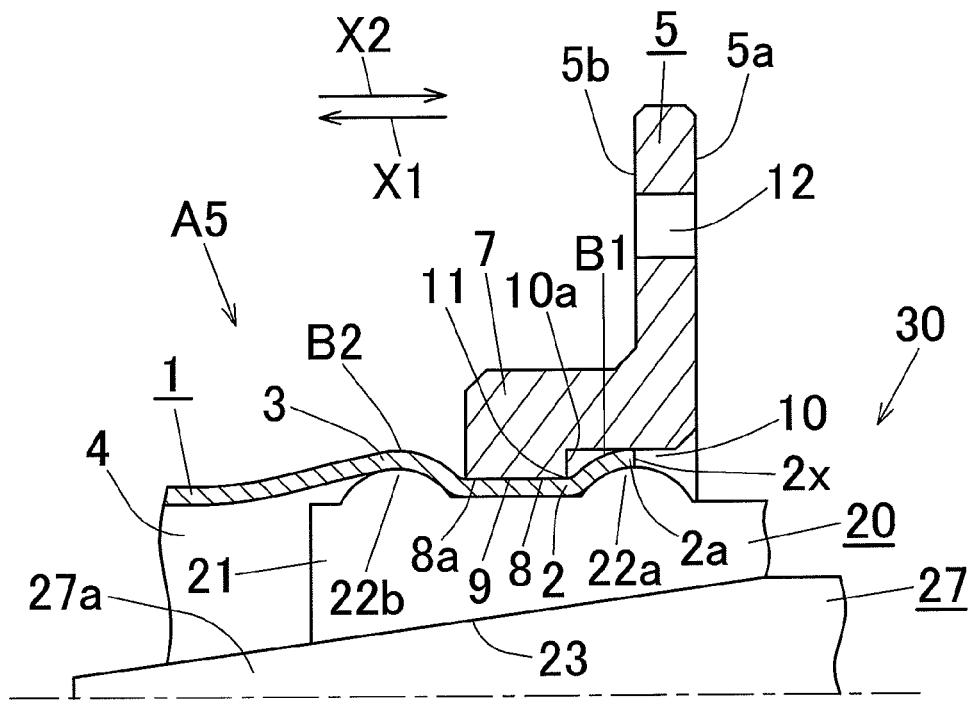
FIG. 16 is a half cross-sectional view showing a state after subjecting the end portion of the pipe to an expanding process by the flanged pipe manufacturing method according to a fifth embodiment of the present invention.

FIG. 16 is an explanatory view showing a manufacturing method of a flanged pipe A5 according to a fifth embodiment of the present invention. This manufacturing method will be explained focusing on the points different from the aforementioned first and second embodiments.

In the fifth embodiment, the flange 5 with a cylindrical portion 7 is a member not formed by pressing a metal plate, but is a member formed by subjecting a forged member, an extruded member, or a die-cast member as a raw material to cutting work, or a member formed by a die-cast method.

At the portion of the inner peripheral surface 9 of the pipe insertion hole 8 of the flange 5 located at the side of the connecting surface 5a of the flange 5, a plurality of engaging dented portions 10 are formed at intervals in the circumferential direction of the pipe insertion hole 8 so as to face the inner side of the pipe insertion hole 8 and the connecting surface 5a side of the flange 5. In detail, each engaging dented portion 10 is formed in the region from the axially intermediate portion of the pipe insertion hole 8 to the connecting surface 5a of the flange 5 on the inner peripheral surface 9 of the pipe insertion hole 8 of the flange 5. The number of the engaging dented portions 10 is, for example, four. Each engaging dented portion 10 is formed by, for example, cutting work, or formed by forging or die-cast.

No chamfering is made on the angular portion 11 between the inner peripheral surface 9 of the pipe insertion hole 8 of the flange 5 and the inner side surface 10a of each engaging dented portion 10. Therefore, the angular portion 11 is angular. The cross-sectional angle of this angular portion 11 is set to 90°.

Furthermore, the flanged pipe A5 is manufactured by the same method as the manufacturing method of the flanged pipe A2 of the aforementioned second embodiment. Although not illustrated in FIG. 16, a restriction member is preferably disposed outside the cylindrical portion 7 of the flange 5 during the expanding process.

In this flanged pipe A5, at the end face portion 2a of the end portion 2 of the pipe 1, a total of four first expanded portions B1 each locally expanded outwardly of the pipe 1 by an expanding process are formed at equal intervals in the circumferential direction of the pipe 1. Each first expanded portion B1 is positioned in each engaging dented portion 10 and engaged with each engaging dented portion 10 in the pull-out direction X1 of pulling out the end portion 2 of the pipe 1 from the pipe insertion hole 8 and in the circumferential direction Y of the pipe insertion hole 8.

Furthermore, at the adjacent portion 3 of the end portion 2 of the pipe 1, a second expanded portion B2 locally expanded outwardly of the pipe 1 by the expanding process is formed along the entire circumference of the pipe 1. This second expanded portion B2 is engaged with the tip end of the cylindrical portion 7 of the flange 5 in the insertion direction X2 of inserting the end portion 2 of the pipe 1 into the pipe insertion hole 8.

In the fifth embodiment, as mentioned above, the plurality of engaging dented portions 10 are formed on the portion of the inner peripheral surface 9 of the pipe insertion hole 8 of the flange 5 located at the side of the connecting surface 5a of the flange 5 at intervals in the circumferential direction of the pipe insertion hole 8. Therefore, in the present invention, other than the above, for example, it can be configured such that the number of the engaging dented portions 10 is one and that this engaging dented portion 10 is formed on the side of the connecting surface 5a of the flange 5 on the inner peripheral surface 9 of the pipe insertion hole 8 of the flange 5 along the entire peripheral surface 9 of the pipe insertion hole 8. In this case, the end portion 2 of the pipe 1 is subjected to an expanding process so that the end portion 2 is engaged with the engaging dented portion 10 along the entire periphery of the circumferential direction of the pipe insertion hole 8 in the pull-out direction X1 of pulling out the end portion 2 of the pipe 1 from the pipe insertion hole 8.

Sixth Embodiment

Figure 17:
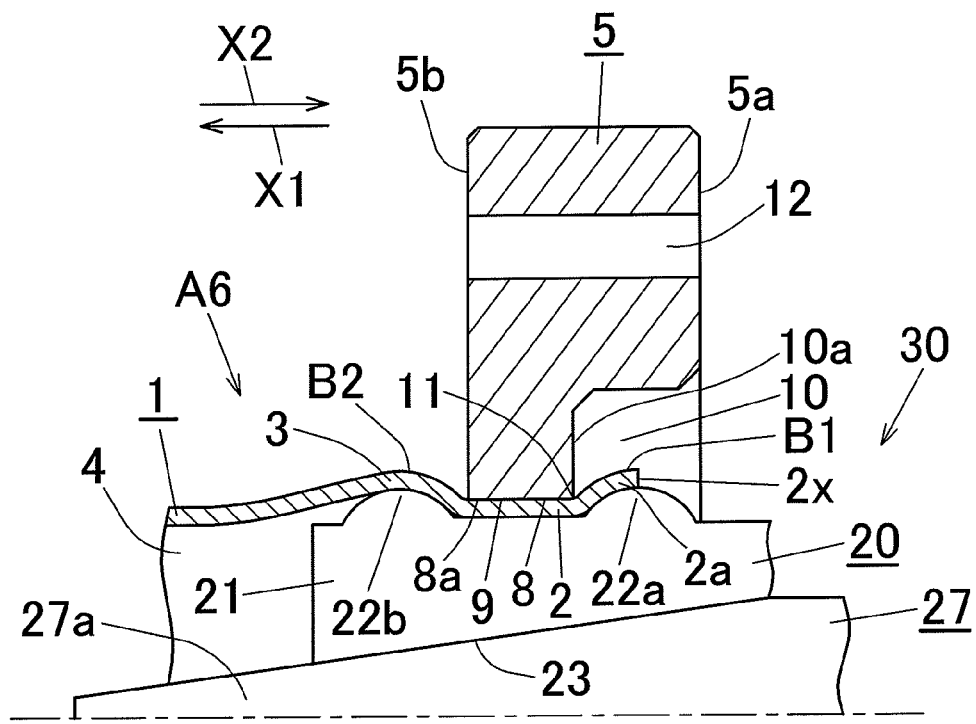
FIG. 17 is a half cross-sectional view showing a state after subjecting the end portion of the pipe to an expanding process by the flanged pipe manufacturing method according to a sixth embodiment of the present invention.
Figure 18:
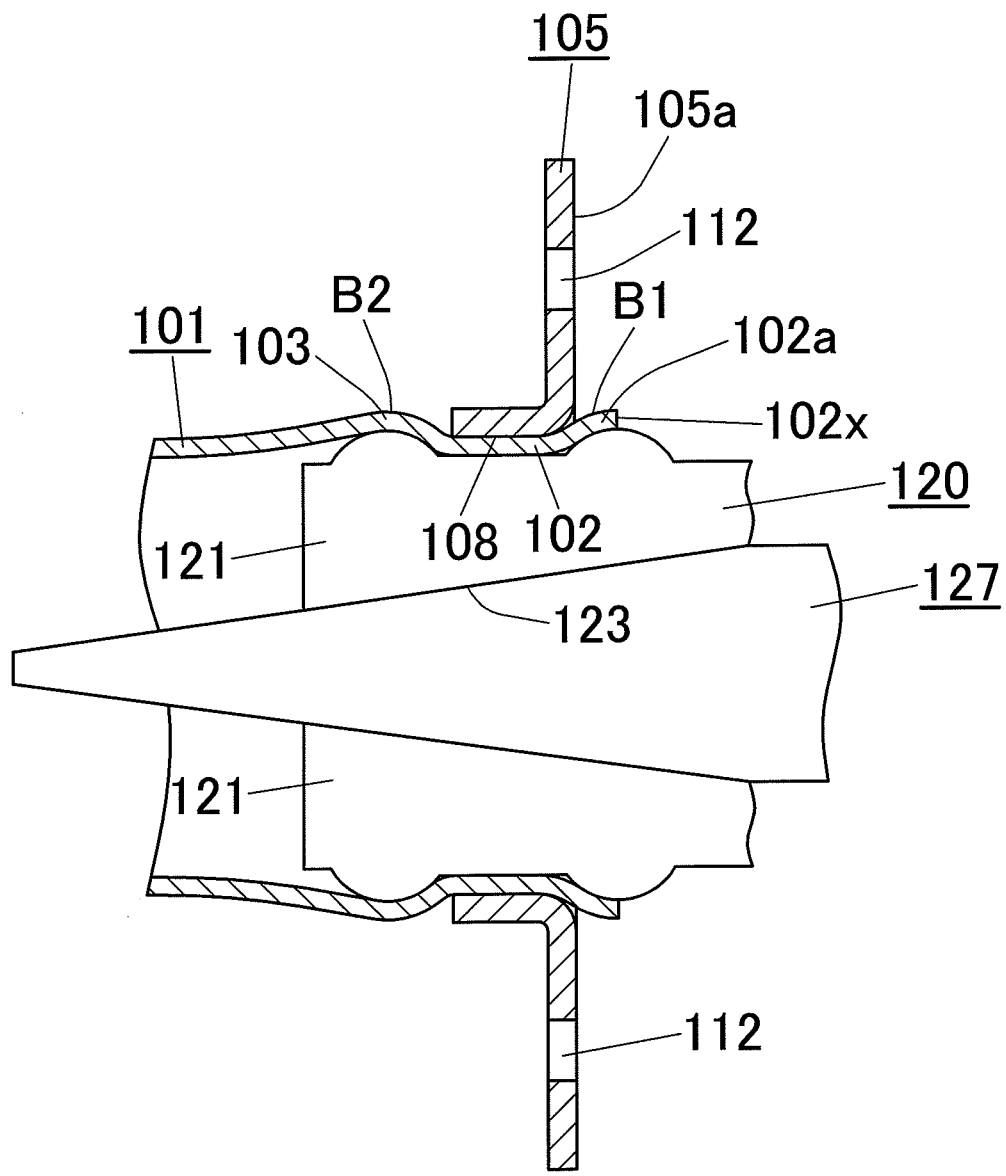
FIG. 18 is cross-sectional view showing a state after subjecting the end portion of the pipe to an expanding process by a conventional flanged pipe manufacturing method.
Figure 19:
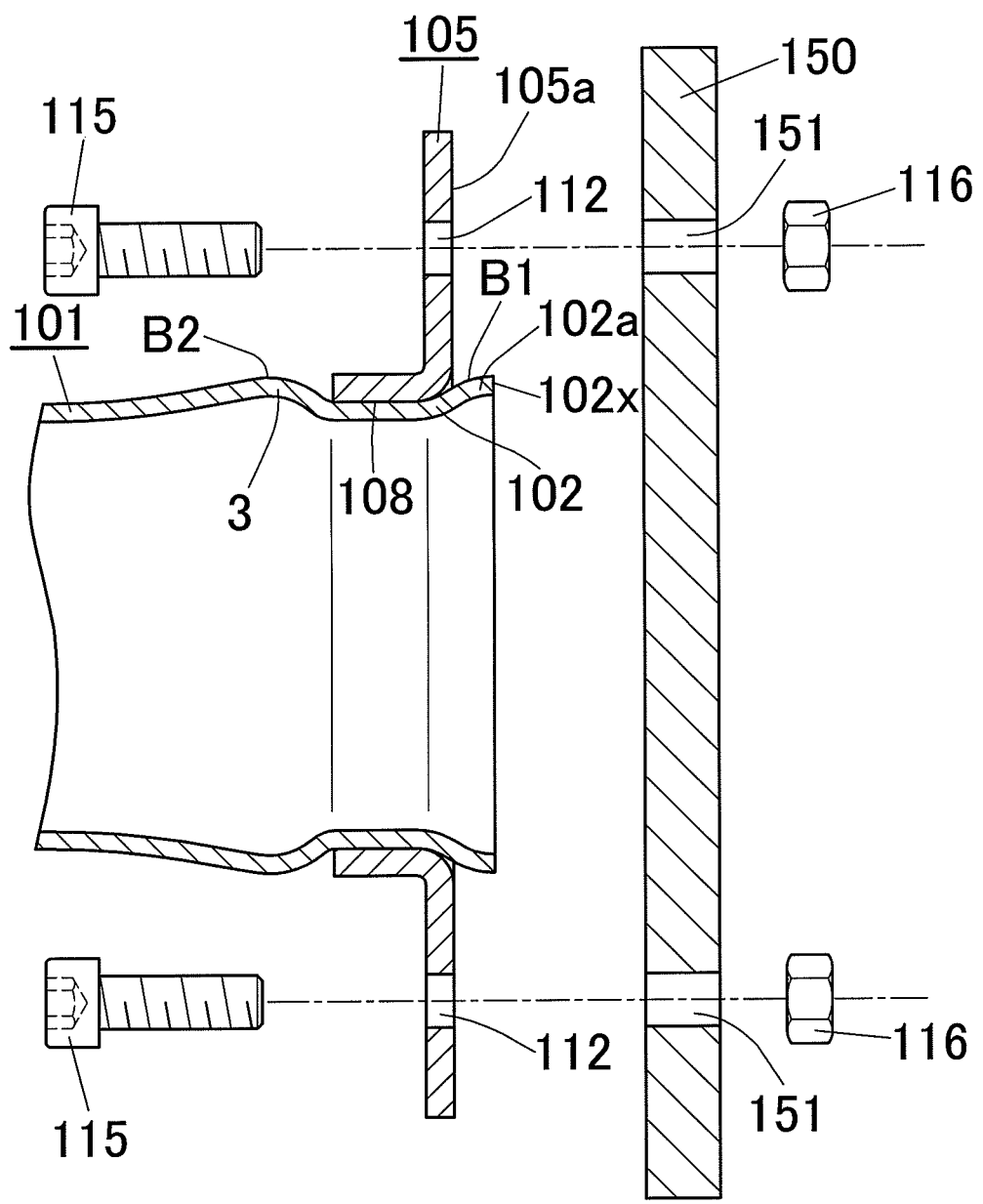
FIG. 19 is a cross-sectional view showing a state in the middle of connecting the flange of the flanged pipe manufactured by a conventional flanged pipe manufacturing method to another member.

FIG. 17 is an explanatory view showing a manufacturing method of a flanged pipe A6 according to a sixth embodiment of the present invention. This manufacturing method will be explained focusing on the points different from the aforementioned first and second embodiments.

In this sixth embodiment, the flange 5 has no cylindrical portion. This flange 5 is a member formed by subjecting a forged member, an extruded member, or a die-cast member as a raw material to cutting work, or a member formed by a die-cast method.

At the portion of the inner peripheral surface 9 of the pipe insertion hole 8 of the flange 5 located at the side of the connecting surface 5a of the flange 5, a plurality of engaging dented portions 10 are formed at intervals in the circumferential direction of the pipe insertion hole 8 so as to face the inner side of the pipe insertion hole 8 and the connecting surface 5a side of the flange 5. In detail, each engaging dented portion 10 is formed in the region from the axially intermediate portion of the pipe insertion hole 8 to the connecting surface 5a of the flange 5 on the inner peripheral surface 9 of the pipe insertion hole 8 of the flange 5. The number of the engaging dented portions 10 is, for example, four. Each engaging dented portion 10 is formed by, for example, cutting work, or formed by forging or die-cast.

No chamfering is made on the angular portion 11 between the inner peripheral surface 9 of the pipe insertion hole 8 of the flange 5 and the inner side surface 10a of each engaging dented portion 10. Therefore, the angular portion 11 is angular. The cross-sectional angle of this angular portion 11 is set to 90°.

Furthermore, the flanged pipe A6 is manufactured by the same method as the manufacturing method of the flanged pipe A2 of the aforementioned second embodiment. In this sixth embodiment, since the flange 5 has no cylindrical portion, it is not necessary to use a restriction member during the expanding process.

In this flanged pipe A6, at the end face portion 2a of the end portion 2 of the pipe 1, a total of four first expanded portions B1 each locally expanded outwardly of the pipe 1 by an expanding process are formed at equal intervals in the circumferential direction of the pipe 1. Each first expanded portion B1 is positioned in each engaging dented portion 10 and engaged with each engaging dented portion 10 in the pull-out direction X1 of pulling out the end portion 2 of the pipe 1 from the pipe insertion hole 8 and in the circumferential direction Y of the pipe insertion hole 8.

Furthermore, at the adjacent portion 3 of the end portion 2 of the pipe 1, a second expanded portion B2 locally expanded outwardly of the pipe 1 by the expanding process is formed along the entire circumference of the pipe 1. This second expanded portion B2 is engaged with the tip end of the cylindrical portion 7 of the flange 5 in the insertion direction X2 of inserting the end portion 2 of the pipe 1 into the pipe insertion hole 8.

In the aforementioned sixth embodiment, as mentioned above, the plurality of engaging dented portions 10 are formed on the portion of the inner peripheral surface 9 of the pipe insertion hole 8 of the flange 5 located at the side of the connecting face 5a of the flange 5 at intervals in the circumferential direction of the pipe insertion hole 8. In the present invention, however, other than the above, for example, it can be configured such that the number of the engaging dented portions 10 is one and that this engaging dented portion 10 is formed on the side of the connecting surface 5a of the flange 5 on the inner peripheral surface 9 of the pipe insertion hole 8 of the flange 5 along the entire peripheral surface 9 of the pipe insertion hole 8. In this case, the end portion 2 of the pipe 1 is subjected to an expanding process so that the end portion 2 is engaged with the engaging dented portion 10 along the entire periphery of the circumferential direction of the pipe insertion hole 8 in the pull-out direction X1 of pulling out the end portion 2 of the pipe 1 from the pipe insertion hole 8.

Although several embodiments of the present invention were explained, the present invention is not limited to the aforementioned embodiments and can be changed in various manner.

For example, in the aforementioned embodiments, the number of dividing the die 20 is eight. In the present invention, however, the number of dividing the die 20 is not limited to eight, and can be changed variously. It can be, for example, 3 to 10, or an even number or an odd number.

In the present invention, the end portion 2 of the pipe 1 can be subjected to an expanding process such that two or more pull-out preventing expanded portions B1 are formed on the end portion 2 of the pipe 1 at intervals in the pipe axial direction.

Furthermore, in the present invention, the cross-sectional shape of the pipe 1 is not limited to a circular shape, and can be, for example, a polygonal shape (e.g., a square shape or a hexagonal shape).

Furthermore, in the present invention, a partition wall portion(s) (not illustrated) extending in the axial direction of the pipe 1 can be provided within the hollow portion 4 of the pipe 1.

Furthermore, in the aforementioned embodiment, the wedge portion 27a of the mandrel 27 is pressed and moved in the axial direction of the mandrel 27 by mandrel driving means, so that the wedge portion 27a of the mandrel 27 is inserted in the wedge hole portion 23 of the die 20. In the present invention, however, the insertion method for inserting the wedge portion 27a of the mandrel 27 into the wedge hole portion 23 of the die 20 is not limited to the aforementioned method. For example, the wedge portion 27a of the mandrel 27 can be pulled and moved in the axial direction of the mandrel 27 by mandrel driving means so that the wedge portion 27a of the mandrel 27 is inserted into the wedge hole portion 23 of the die 20.

Furthermore, the manufacturing method and the manufacturing device of a flanged pipe can be constituted by combining two or more technical concepts applied to the aforementioned first to sixth embodiments.

This application claims priority to Japanese Patent Application No. 2007-284234 filed on Oct. 31, 2007, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

INDUSTRIAL APPLICABILITY

The present invention can be utilized as a manufacturing method of a flanged pipe used as, for example, automobile parts, such as, e.g., a steering support beam, a steering column holder, a muffler, a frame, a propeller shaft, or a suspension arm, or a piping member as parts other than automobile parts, a manufacturing device of a flanged pipe used for the manufacturing method, and a flanged pipe.

The invention claimed is:

1. A flanged pipe in which a flange having a pipe insertion hole and a connecting surface to be connected to another member is connected to an end portion of a pipe with the end portion of the pipe inserted in the pipe insertion hole,
   wherein at least one engaging dented portion is located at a region from an axially intermediate portion of the pipe insertion hole (8) to a position of the connecting surface (5a) on an inner peripheral surface of the pipe insertion hole of the flange (5),
   wherein the end portion (2) of the pipe is located in the pipe insertion hole (8) of the flange with an end face (2x) of the pipe positioned within a range from the axially intermediate portion of the pipe insertion hole to the position of the connecting surface of the flange,
   wherein the end portion of the pipe has a pull-out preventing first expanded portion (B1) and an adjacent portion of the end portion of the pipe opposite to the end face side of the pipe has a pull-out preventing second expanded portion (B2), are expanded, whereby the flange is connected to the end portion of the pipe, wherein the pull-out preventing first expanded portion (B1) extends outward in a plastically deformed expanded state such that the end portion of the pipe (B1) is engaged with the at least one engaging dented portion in a pull-out direction of the pipe from the pipe insertion hole, wherein the pull-out preventing second expanded portion (B2) extends outward in a plastically deformed expanded state such that the end portion of the pipe has a circumferential expanded portion around a periphery of the pipe that is engaged with a tip end of the cylindrical portion of the flange in an insertion direction of the pipe into the pipe insertion hole, is engaged with the at least one engaging dented portion in a pull out direction of pulling out the end portion of the pipe from the pipe insertion hole, wherein said at least one engaging dented portion includes a plurality of through holes (10) within an axially intermediate portion of a cylindrical portion (7) of the flange penetrating in a thickness direction of the cylindrical portion and arranged at intervals in a circumferential direction of the pipe insertion hole, said cylindrical portion of the flange being in a substantially non-plastically deformed state and elastically pressing against said pipe;

wherein the plurality of through holes (10) extend entirely through said cylindrical portion at intervals in a circumferential direction of the pipe insertion hole, and wherein said pull-out preventing first expanded portion (B1) includes expanded portions that extend through said through-holes;

wherein the flange is integrally provided with said cylindrical portion protruded opposite to the connecting surface of the flange and having a hollow portion as the pipe insertion hole.

2. The flanged pipe as recited in claim 1, wherein an angular portion between the inner peripheral surface of the pipe insertion hole and an inner side surface of the at least one engaging dented portion is angular, and wherein a cross-sectional angle of the angular portion is set to 90° or less.

3. A flanged pipe in which a flange having a pipe insertion hole and a connecting surface to be connected to another member is connected to an end portion of a pipe with the end portion of the pipe inserted in the pipe insertion hole, wherein at least one engaging dented portion is located at a region from an axially intermediate portion of the pipe insertion hole (8) to a position of the connecting surface (5) on an inner peripheral surface of the pipe insertion hole of the flange (5), wherein the end portion (2) of the pipe is located in the pipe insertion hole (8) of the flange with an end face (2x) of the pipe positioned within a range from the axially intermediate portion of the pipe insertion hole to the position of the connecting surface of the flange, wherein the end portion of the pipe has a pull-out preventing first expanded portion (B1) and an adjacent portion of the end portion of the pipe opposite to the end face side of the pipe has a pull-out preventing second expanded portion (B2), wherein the flange is integrally provided with a cylindrical portion (7) protruded opposite to the connecting surface of the flange and having a hollow portion as the pipe insertion hole, said cylindrical portion of the flange being in a substantially non-plastically deformed state and elastically pressing against said pipe, wherein said at least one engaging dented portion is within said cylindrical portion, and wherein said end portion of the pipe has a first expanded portion (B2) that extends outward in a plastically deformed state within said at least one engaging dented portion and has a second expanded portion that extends outward in a plastically deformed state adjacent a tip end of the cylindrical portion such as to engage said tip end of the cylindrical portion, whereby said first expanded portion (B1) engages the at least one dented portion to inhibit movement in the pull-out direction and said second expanded portion (B2) engages the tip end of the cylindrical portion to inhibit movement in the insertion direction of the cylindrical portion;

wherein the axially intermediate portion of the cylindrical portion of the flange has a plurality of through-holes penetrating in a thickness direction of the cylindrical portion and arranged at intervals in a circumferential direction of the pipe insertion hole, wherein each engaging dented portion is formed by each through-hole.

* * * * *